(12) United States Patent
Keefer et al.

(10) Patent No.: US 6,533,846 B1
(45) Date of Patent: Mar. 18, 2003

(54) MODULAR PRESSURE SWING ADSORPTION APPARATUS WITH CLEARANCE-TYPE VALVE SEALS

(75) Inventors: Bowie G. Keefer, Vancouver (CA); Christopher McLean, Vancouver (CA); Les Jeziorowski, Coquitlan (CA); Kevin A. Kaupert, Reno, NV (US); Marie-Claude Taponat, Vancouver (CA); Christopher Stoner, Vancouver (CA)

(73) Assignee: QuestAir Technologies, Inc. (CA)

( * ) Notice: Subject to any disclaimer, the term of this patent is extended or adjusted under 35 U.S.C. 154(b) by 0 days.

(21) Appl. No.: 10/007,654

(22) Filed: Dec. 10, 2001

Related U.S. Application Data

(63) Continuation of application No. PCT/CA00/00695, filed on Jun. 12, 2000.

(51) Int. Cl.⁷ .............................. B01D 53/06; F16K 1/16
(52) U.S. Cl. .................. 96/125; 96/402; 251/149.2; 251/313; 137/625.46
(58) Field of Search .................... 96/113, 124, 125, 96/152, 400, 402; 55/502; 251/12, 149, 149.2, 298, 313, 336, 304; 137/625.42, 625.46

(56) References Cited

U.S. PATENT DOCUMENTS

| | | | | |
|---|---|---|---|---|
| 3,176,446 A | * | 4/1965 | Siggelin | 165/10 |
| 4,452,612 A | * | 6/1984 | Mattia | 95/100 |
| 4,758,253 A | * | 7/1988 | Davidson et al. | 502/400 |
| 5,133,784 A | * | 7/1992 | Boudet et al. | 95/100 |
| 5,246,676 A | * | 9/1993 | Hay | 423/219 |
| 5,393,326 A | * | 2/1995 | Engler et al. | 95/103 |
| 5,441,559 A | * | 8/1995 | Petit et al. | 96/125 |
| 6,004,384 A | * | 12/1999 | Caudle | 55/502 |
| 6,311,719 B1 | * | 11/2001 | Hill et al. | 137/240 |
| 6,406,523 B1 | * | 6/2002 | Connor et al. | 96/125 |
| 6,451,095 B1 | * | 9/2002 | Keefer et al. | 96/125 |

FOREIGN PATENT DOCUMENTS

| | | |
|---|---|---|
| WO | WO 97/39821 | 10/1997 |
| WO | WO 99/01202 | 1/1999 |
| WO | WO 99/28013 | 6/1999 |

\* cited by examiner

*Primary Examiner*—David A. Simmons
*Assistant Examiner*—Frank M. Lawrence
(74) *Attorney, Agent, or Firm*—Katten Muchin Zavis Rosenman

(57) ABSTRACT

A rotary module for implementing a high frequency pressure swing adsorption process includes a stator having a number of function compartments opening into the stator valve faces, a rotor rotatably coupled to the stator and including a number of apertures opening into the rotor valve faces, and a self-regulating clearance-type valve seal positioned between the valve faces of the stator and rotor so as to regulate the rate of gas flow between the stator and the rotor. Each valve seal includes a sealing face disposed adjacent a respective one of the rotor valve faces and is pivotable relative to the respective rotor valve face for varying the gas flow rate in accordance with the clearance distance between the sealing face and the respective rotor valve face. Each valve seal also includes a passage which communicates with one of the function compartments for varying the clearance distance in response to a pressure differential between the passage and an approaching aperture. In this way, the valve seal maintains a smooth pressure transition profile as the flow paths are switched between the function compartments. As a result, equilibrium is maintained between the adsorbent material and the mass transfer front of the gas, and the efficiency of the gas separation process is enhanced.

68 Claims, 23 Drawing Sheets

MODULAR PRESSURE SWING ADSORPTION APPARATUS WITH CLEARANCE-TYPE VALVE SEALS

This application is a continuation of international application PCT/CA00/00695, filed Jun. 12, 2000.

FIELD OF THE INVENTION

The present invention relates to an apparatus for separating gas fractions from a gas mixture having multiple gas fractions. In particular, the present invention relates to a rotary valve gas separation system having a plurality of rotating adsorbent beds disposed therein for implementing a pressure swing adsorption process for separating out the gas fractions.

BACKGROUND OF THE INVENTION

Pressure swing adsorption (PSA) and vacuum pressure swing adsorption (vacuum-PSA) separate gas fractions from a gas mixture by coordinating pressure cycling and flow reversals over an adsorbent bed which preferentially adsorbs a more readily adsorbed component relative to a less readily adsorbed component of the mixture. The total pressure of the gas mixture in the adsorbent bed is elevated while the gas mixture is flowing through the adsorbent bed from a first end to a second end thereof, and is reduced while the gas mixture is flowing through the adsorbent from the second end back to the first end. As the PSA cycle is repeated, the less readily adsorbed component is concentrated adjacent the second end of the adsorbent bed, while the more readily adsorbed component is concentrated adjacent the first end of the adsorbent bed. As a result, a "light" product (a gas fraction depleted in the more readily adsorbed component and enriched in the less readily adsorbed component) is delivered from the second end of the bed, and a "heavy" product (a gas fraction enriched in the more strongly adsorbed component) is exhausted from the first end of the bed.

The conventional system for implementing pressure swing adsorption or vacuum pressure swing adsorption uses two or more stationary adsorbent beds in parallel, with directional valving at each end of each adsorbent bed to connect the beds in alternating sequence to pressure sources and sinks. However, this system is often difficult and expensive to implement due to the complexity of the valving required.

Furthermore, the conventional PSA system makes inefficient use of applied energy, because feed gas pressurization is provided by a compressor whose delivery pressure is the highest pressure of the cycle. In PSA, energy expended in compressing the feed gas used for pressurization is then dissipated in throttling over valves over the instantaneous pressure difference between the adsorber and the high pressure supply. Similarly, in vacuum-PSA, where the lower pressure of the cycle is established by a vacuum pump exhausting gas at that pressure, energy is dissipated in throttling over valves during countercurrent blowdown of adsorbers whose pressure is being reduced. A further energy dissipation in both systems occurs in throttling of light reflux gas used for purge, equalization, cocurrent blowdown and product pressurization or backfill steps.

Numerous attempts have been made at overcoming the deficiencies associated with the conventional PSA system. For example, Siggelin (U.S. Pat. No. 3,176,446), Mattia (U.S. Pat. No. 4,452,612), Davidson and Lywood (U.S. Pat. No. 4,758,253), Boudet et al (U.S. Pat. No. 5,133,784), Petit et al (U.S. Pat. No. 5,441,559) and Schartz (PCT publication WO 94/04249) disclose PSA devices using rotary distributor valves having rotors fitted with multiple angularly separated adsorbent beds. Ports communicating with the rotor-mounted adsorbent beds sweep past fixed ports for feed admission, product delivery and pressure equalization. However, these prior art rotary distributor valves are impracticable for large PSA units, owing to the weight of the rotating assembly. Furthermore, since the valve faces are remote from the ends of the adsorbent beds, these rotary distributor valves have considerable dead volume for flow distribution and collection. As a result, the prior art rotary distributor valves have poor flow distribution, particularly at high cycle frequencies.

Hay (U.S. Pat. No. 5,246,676) and Engler (U.S. Pat. No. 5,393,326) provide examples of vacuum pressure swing adsorption systems which reduce throttling losses in an attempt to improve the efficiency of the gas separation process system. The systems taught by Hay and Engler use a plurality of vacuum pumps to pump down the pressure of each adsorbent bed sequentially in turn, with the pumps operating at successively lower pressures, so that each vacuum pump reduces the pressure in each bed a predetermined amount. However, with these systems, the vacuum pumps are subjected to large pressure variations, stressing the compression machinery and causing large fluctuations in overall power demand. Because centrifugal or axial compression machinery cannot operate under such unsteady conditions, rotary lobe machines are typically used in such systems. However, such machines have lower efficiency than modem centrifugal compressors/vacuum pumps working under steady conditions.

Accordingly, there remains a need for a PSA system which is suitable for high volume and high frequency production, while reducing the losses associated with the prior art devices.

SUMMARY OF THE INVENTION

According to the invention, there is provided a PSA gas separation system which addresses the deficiencies of the prior art PSA systems.

The gas separation system, in accordance with the invention, comprises a stator and a rotor rotatably coupled to the stator. The stator includes a first stator valve face, a second stator valve face, a number of first function compartments opening into the first stator valve face, and a number of second function compartments opening into the second stator valve face. The rotor includes a first rotor valve surface in communication with the first stator valve face, a second rotor valve face in communication with the second stator valve face, and a number of flow paths for receiving adsorbent material therein which preferentially adsorbs a first gas component of a feed gas mixture in response to increasing pressure in relation to a second gas component of the feed gas mixture. The rotor also includes a number of apertures provided in the rotor valve faces in communication with the function compartments and the ends of the flow paths.

Compression machinery, which can deliver and receive gas flow at a number of discrete pressure levels, is coupled to the function compartments so as to maintain uniformity of gas flow through the function compartments. As a result, mechanical stresses on the compression machinery is reduced, allowing use of centrifugal or axial compression machinery.

The gas separation system includes a number of variable-gap clearance-type valve seals interposed between the first rotor valve face and the first stator valve face and between the second rotor valve face and the second stator valve face. Each variable-gap clearance seal includes a sealing face disposed adjacent a respective one of the rotor valve faces and is pivotal relative to the respective rotor valve face for varying the gas flow rate in accordance with the clearance distance between the sealing face and the respective rotor valve face. Each variable-gap clearance scale also includes an opposing face disposed adjacent the respective stator valve face, with the opposing face and the respective stator valve face together defining a passage therebetween which communicates with one of the function compartments for varying the clearance distance in response to a pressure differential between the passage and an adjacent opposite end. In this way, the seal maintains a smooth pressure transition profile as the flow paths are switched between the function compartments. As a result, equilibrium is maintained between the adsorbent material and the mass transfer front of the gas, and the efficiency of the gas separation process is enhanced.

The gas separation system also includes a number of fixed-gap clearance-type valve seals interposed between the first rotor valve face and the first stator valve face and between the second rotor valve face and the second stator valve face for sealing respective ends of the flow paths. Each fixed-gap clearance seal is substantially identical to the variable-gap clearance seal, including a sealing face disposed adjacent a respective one of the rotor valve faces, an opposing face disposed adjacent the respective stator valve face, and a passage between the opposing face and the stator valve face for pressurizing the sealing face against the rotor valve face. However, the compartment does not communicate with any function compartment, and the fixed-gap clearance seal is fixed at at least one end thereof relative to the respective rotor valve face so as to restrict variations in the clearance gap and to prevent gas leakage from each flow path end passing the sealing face.

In one embodiment of the invention, each variable-gap clearance-type valve seal is positioned between adjacent blowdown function compartments and consists of an elongate slipper having a sealing face and an opposing face extending between the ends of the slipper. Each slipper is pivotally coupled adjacent one of the respective slipper ends to the respective rotor valve face, and includes a resilient biasing element positioned equidistantly between the slipper ends and extending between the stator valve face and the respective opposing slipper face. Further, each passage comprises a compartment defined by the respective stator valve face, the opposing faces of adjacent sealing elements, and adjacent biasing elements, and provides a linear pressure transition profile, at the flow path ends, between the pressure of one of the adjacent blowdown compartments and the pressure of the other of the adjacent blowdown compartments. Since each flow path end opens fully to one of the adjacent blowdown compartments prior to traversing the sealing face of the valve seal, the pressure at the end of each flow path drops linearly from the pressure it attained prior to traversing the sealing face to the pressure of the other of the adjacent blowdown compartments.

In another embodiment of the invention, each variable-gap clearance-type valve seal is positioned between adjacent pressurization function compartments, includes a resilient biasing element positioned at each slipper end and extending between the stator valve face and the respective opposing slipper face. Each passage comprises a compartment defined by the respective stator valve face, the opposing faces of adjacent sealing elements, and the respective biasing elements, and includes an aperture positioned equidistantly between the slipper ends and extending through the slipper between the respective sealing face and the respective opposing face so as to provide a linear pressure transition profile, at the flow path ends, between the pressure of one of the adjacent pressurization compartments and the pressure of the other of the adjacent pressurization compartments. Since each flow path end opens fully to one of the adjacent pressurization compartments prior to traversing the sealing face of the valve seal, the pressure at the end of each flow path increases linearly from the pressure it attained prior to traversing the sealing face to the pressure of the other of the adjacent pressurization compartments.

In operation, a feed gas mixture, including a first gas component and a second gas component, is delivered to the rotor flow paths through the first rotor-stator valve surface pair, and the rotor is rotated at a frequency so as to expose the gas mixture in each rotor flow path to cyclical changes in pressure and direction of flow. These cyclical changes cause the more readily adsorbed component of the feed gas to be exhausted as heavy product gas from the first rotor-stator valve surface pair and the less readily adsorbed component to be delivered as light product gas from the second rotor-stator valve surface pair. To enhance gas separation, light reflux exit gas is withdrawn from the second rotor-stator valve surface pair and is returned after pressure letdown to the second rotor-stator valve surface pair.

In order for the flowing gas streams entering or exiting the function compartments to be substantially uniform in pressure and velocity, the feed gas is delivered to the rotor flow paths, through the clearance seals, at plurality of incremental feed gas pressure levels. Similarly, the heavy product gas is exhausted from the rotor flow paths as countercurrent blowdown gas, through the clearance seals, at a plurality of decremental exhaust gas pressure levels. Preferably, the light reflux exit gas is withdrawn from the rotor flow paths, through the clearance seals, at a plurality of decremental light reflux exit pressure levels and is returned to the rotor flow paths as light reflux return gas, through the clearance seals, at pressure levels less than the respective light reflux exit pressure level.

Preferably the rotor also has a large number of adsorbers such that several adsorbers are exposed to each pressure level at any given moment. During pressurization and blowdown steps, the pressures of the adsorbers passing through each of these steps converge to the nominal pressure level of each step by a throttling pressure equalization, through the clearance seals, from the pressure level of the previous step experienced by the adsorbers. Flow is provided to the adsorbers in a pressurization step or withdrawn in a blowdown step by the compression machinery at the nominal pressure level of that step. Hence flow and pressure pulsations seen by the compression machinery at each intermediate pressure level are minimal by averaging from the several adsorbers passing through the step, although each adsorber undergoes large cyclic changes of pressure and flow.

BRIEF DESCRIPTION OF THE DRAWINGS

The preferred embodiments of the present invention will now be described, by way of example only, with reference to the drawings in which:

FIG. 12b is a schematic diagram showing various pressure transition profiles of a flow path end opening to a blowdown compartment, including the pressure transition profile of a flow path end fitted with the clearance seal shown in FIG. 12a;

FIG. 13b is a schematic diagram showing various pressure transition profiles of a flow path end opening to a pressurization compartment, including the pressure transition profile of a flow path end fitted with the clearance seal shown in FIG. 13a;

DETAILED DESCRIPTION OF THE PREFERRED EMBODIMENTS

FIGS. 1, 2, 3 and 4

A rotary module 10 according to the present invention is shown in FIGS. 1, 2, 3 and 4. The module includes a rotor 11' revolving about axis 12 in the direction shown by arrow 13 within stator 14. In general, the apparatus of the invention may be configured for flow through the adsorber elements in the radial, axial or oblique conical directions relative to the rotor axis. However, for operation at high cycle frequency, radial flow has the advantage that the centripetal acceleration will lie parallel to the flow path for most favourable stabilization of buoyancy-driven free convection, as well as centrifugal clamping of granular adsorbent with uniform flow distribution.

Figure 1:
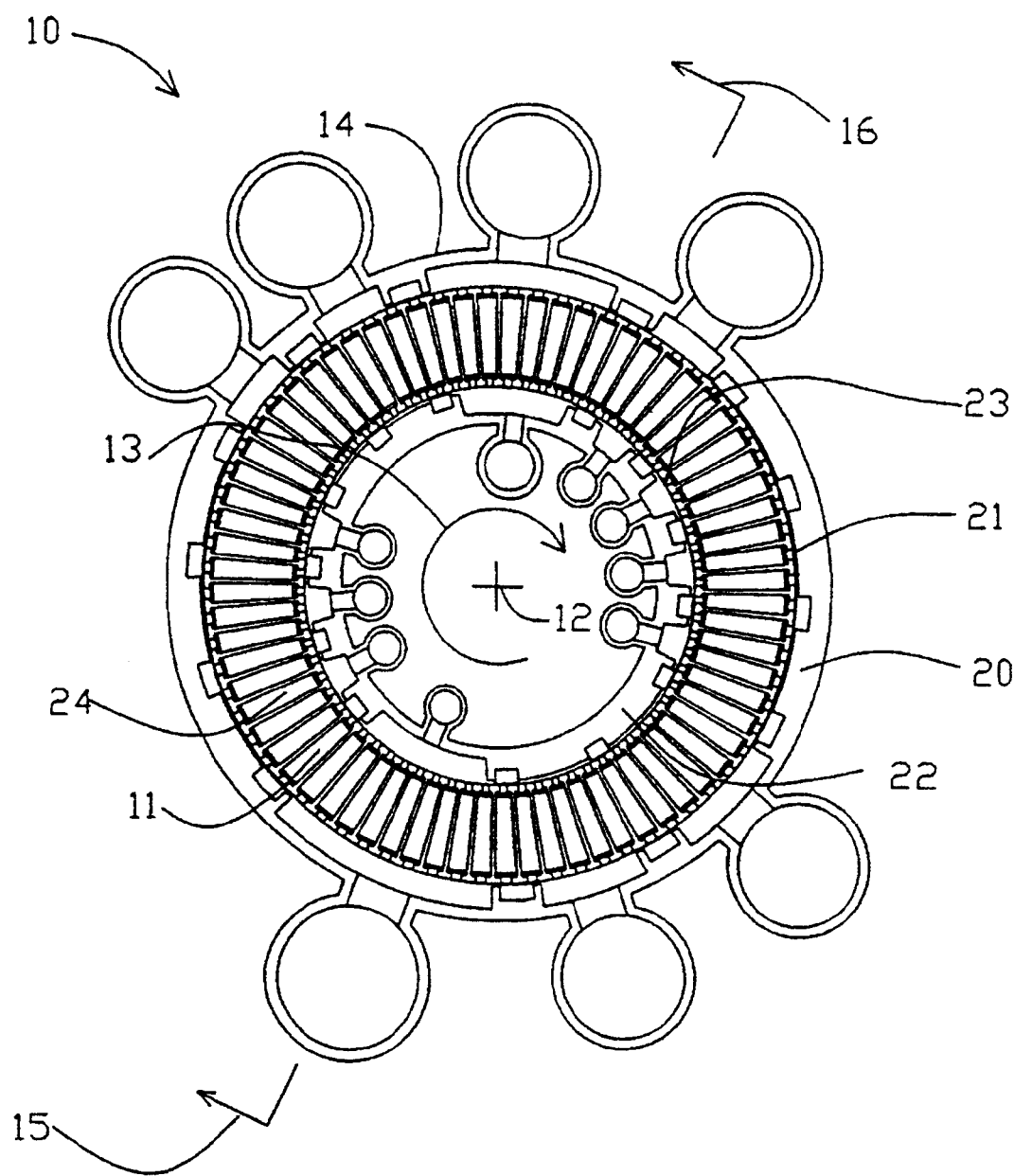
FIG. 1 is a sectional view of a rotary PSA module according to the present invention, showing the stator, the rotor and the adsorber situated in the rotor.
Figure 2:
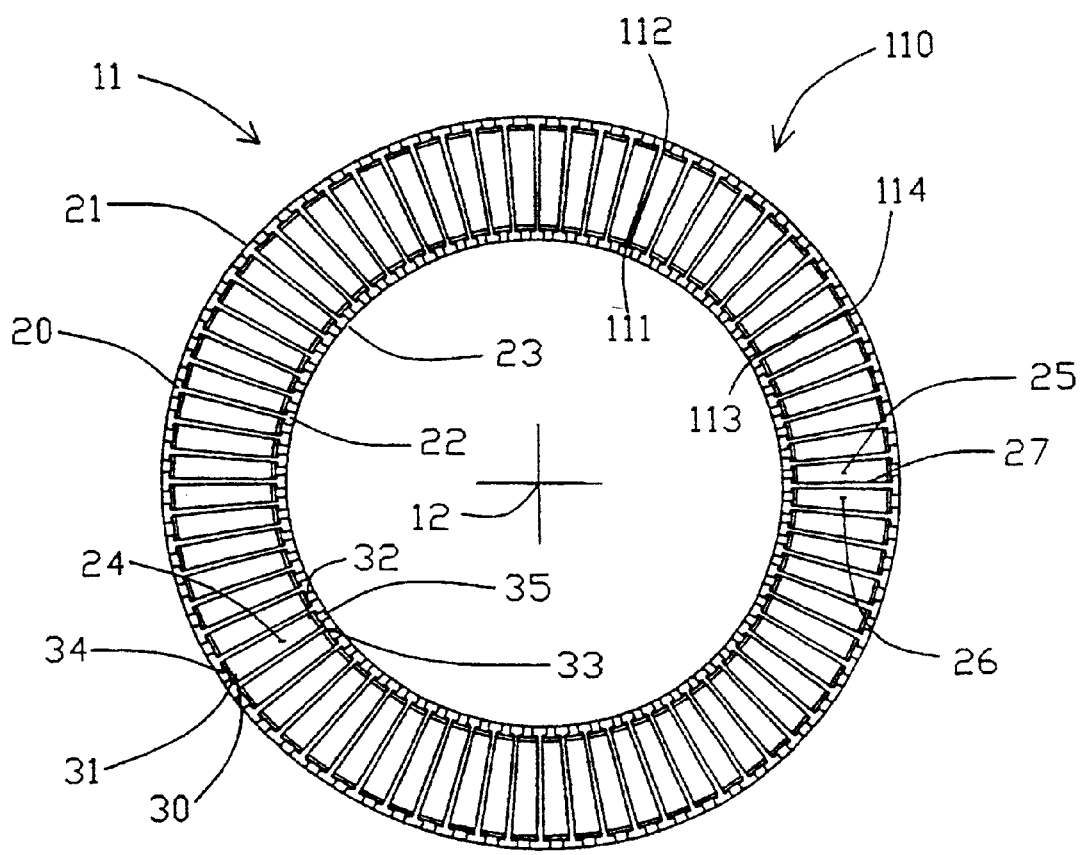
FIG. 2 is a sectional view of the module of FIG. 1, with the stator deleted for clarity.

As shown in FIG. 2, the rotor 11 is of annular section, having concentrically to axis 12 an outer cylindrical wall 20 whose external surface is first valve surface 21, and an inner cylindrical wall 22 whose internal surface is second valve surface 23. The rotor has (in the plane of the section defined by arrows 15 and 16 in FIG. 1) a total of "N" radial flow adsorber elements 24. An adjacent pair of adsorber elements 25 and 26 are separated by partition 27 which is structurally and sealingly joined to outer wall 20 and inner wall 22. Adjacent adsorber elements 25 and 26 are angularly spaced relative to axis 12 by an angle of [360°/N].

Adsorber element 24 has a first end 30 defined by support screen 31 and a second end 32 defined by support screen 33. The adsorber may be provided as granular adsorbent, whose packing voidage defines a flow path contacting the adsorbent between the first and second ends of the adsorber.

First aperture or orifice 34 provides flow communication from first valve surface 21 through wall 20 to the first end 30 of adsorber 24. Second aperture or orifice 35 provides flow communication from second valve surface 23 through wall 22 to the second end 31 of adsorber 24. Support screens 31 and 33 respectively provide flow distribution 32 between first aperture 34 and first end 30, and between second aperture 35 and second end 32, of adsorber element 24. Support screen 31 also supports the centrifugal force loading of the adsorbent.

Figure 3:
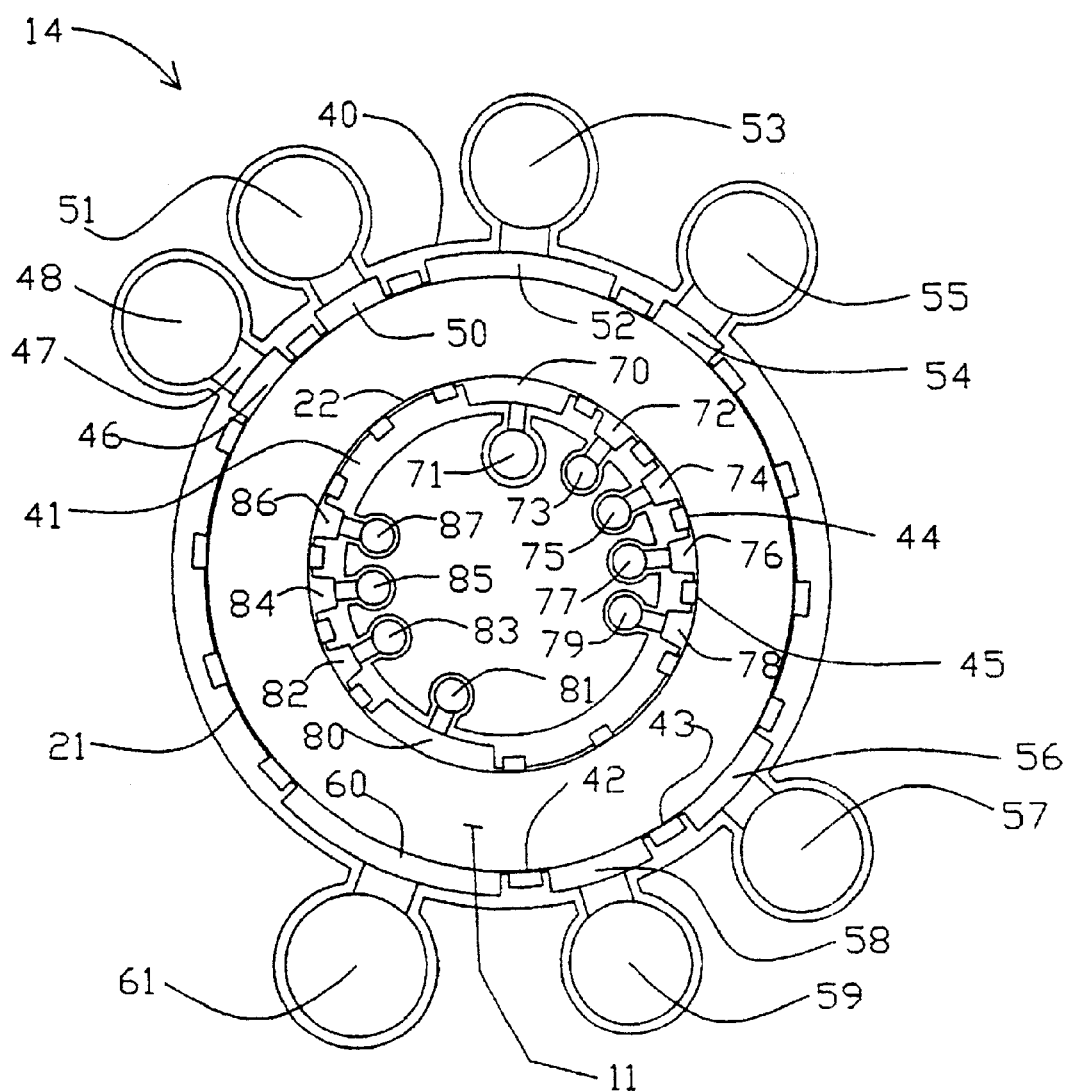
FIG. 3 is a sectional view of the stator shown in FIG. 1, with the adsorbers deleted for clarity.

As shown in FIG. 3, stator 14 is a pressure housing including an outer cylindrical shell or first valve stator 40 outside the annular rotor 11, and an inner cylindrical shell or second valve stator 41 inside the annular rotor 11. Outer shell 40 carries axially extending strip seals (e.g. 42 and 43) sealingly engaged with first valve surface 21, while inner shell 41 carries axially extending strip seals (e.g. 44 and 45) sealingly engaged with second valve surface 23. The azimuthal sealing width of the strip seals is greater than the diameters or azimuthal widths of the first and second apertures 34 and 35 opening through the first and second valve surfaces.

A set of first compartments in the outer shell each open in an angular sector to the first valve surface, and each provide fluid communication between its angular sector of the first valve surface and a manifold external to the module. The angular sectors of the compartments are much wider than the angular separation of the adsorber elements. The first compartments are separated on the first sealing surface by the strip seals (e.g. 42). Proceeding clockwise in FIG. 3, in the direction of rotor rotation, a first feed pressurization compartment 46 communicates by conduit 47 to first feed pressurization manifold 48, which is maintained at a first intermediate feed pressure. Similarly, a second feed pressurization compartment 50 communicates to second feed pressurization manifold 51, which is maintained at a second intermediate feed pressure higher than the first intermediate feed pressure but less than the higher working pressure.

For greater generality, module 10 is shown with provision for sequential admission of two feed mixtures, the first feed gas having a lower concentration of the more readily adsorbed component relative to the second feed gas. First feed compartment 52 communicates to first feed manifold 53, which is maintained at substantially the higher working pressure. Likewise, second feed compartment 54 communicates to second feed manifold 55, which is maintained at substantially the higher working pressure. A first countercurrent blowdown compartment 56 communicates to first countercurrent blowdown manifold 57, which is maintained at a first countercurrent blowdown intermediate pressure. A second countercurrent blowdown compartment 5 8 communicates to second countercurrent blowdown manifold 59, which is maintained at a second countercurrent blowdown intermediate pressure above the lower working pressure. A heavy product compartment 60 communicates to heavy product exhaust manifold 61 which is maintained at substantially the lower working pressure. It will be noted that compartment 58 is bounded by strip seals 42 and 43, and similarly all the compartments are bounded and mutually isolated by strip seals.

A set of second compartments in the inner shell each open in an angular sector to the second valve surface, and each provide fluid communication between its angular sector of the second valve surface and a manifold external to the module. The second compartments are separated on the second sealing surface by the strip seals (e.g. 44). Proceeding clockwise in FIG. 3, again in the direction of rotor rotation, light product compartment 70 communicates to light product manifold 71, and receives light product gas at substantially the higher working pressure, less frictional pressure drops through the adsorbers and the first and second orifices. According to the angular extension of compartment 70 relative to compartments 52 and 54, the light product may be obtained only from adsorbers simultaneously receiving the first feed gas from compartment 52, or from adsorbers receiving both the first and second feed gases.

A first light reflux exit compartment 72 communicates to first light reflux exit manifold 73, which is maintained at a first light reflux exit pressure, here substantially the higher working pressure less frictional pressure drops. A first cocurrent blowdown compartment 74 (which is actually the second light reflux exit compartment), communicates to second light reflux exit manifold 75, which is maintained at a first cocurrent blowdown pressure less than the higher working pressure. A second cocurrent blowdown compartment or third light reflux exit compartment 76 communicates to third light reflux exit manifold 77, which is maintained at a second cocurrent blowdown pressure less than the first cocurrent blowdown pressure. A third cocurrent blowdown compartment or fourth light reflux exit compartment 78 communicates to fourth light reflux exit manifold 79, which is maintained at a third cocurrent blowdown pressure less than the second cocurrent blowdown pressure.

A purge compartment 80 communicates to a fourth light reflux return manifold 81, which supplies the fourth light reflux gas which has been expanded from the third cocurrent blowdown pressure to substantially the lower working pressure with an allowance for frictional pressure drops. The ordering of light reflux pressurization steps is inverted from the ordering of light reflux exit or cocurrent blowdown steps, so as to maintain a desirable "last out-first in" stratification of light reflux gas packets. Hence a first light reflux pressurization compartment 82 communicates to a third light reflux return manifold 83, which supplies the third light reflux gas which has been expanded from the second cocurrent blowdown pressure to a first light reflux pressurization pressure greater than the lower working pressure. A second light reflux pressurization compartment 84 communicates to a second light reflux return manifold 85, which supplies the second light reflux gas which has been expanded from the first cocurrent blowdown pressure to a second light reflux pressurization pressure greater than the first light reflux pressurization pressure. Finally, a third light reflux pressurization compartment 86 communicates to a first light reflux return manifold 87, which supplies the first light reflux gas which has been expanded from approximately the higher pressure to a third light reflux pressurization pressure greater than the second light reflux pressurization pressure, and in this example less than the first feed pressurization pressure.

Figure 4:
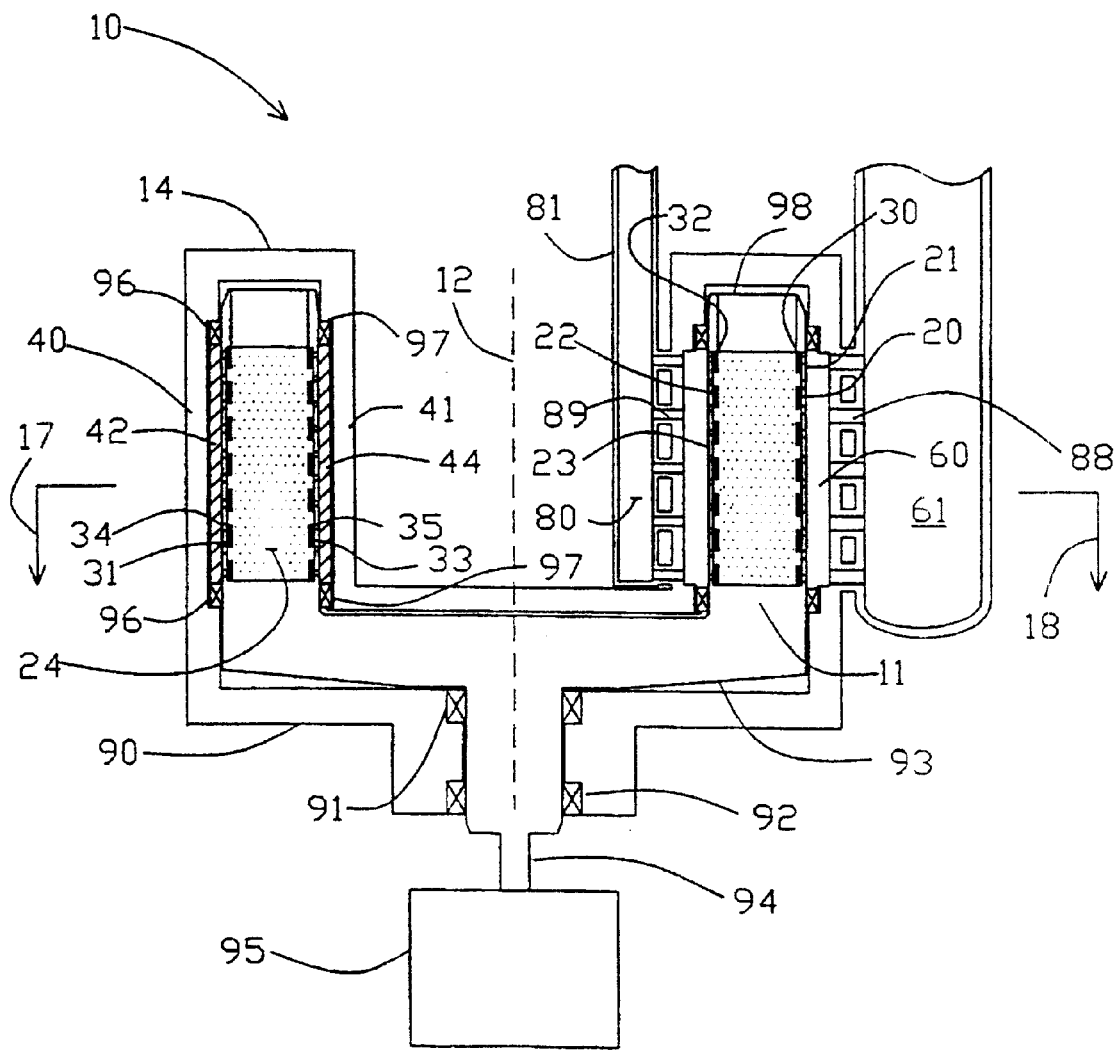
FIG. 4 is an axial section of the module of FIG. 1.

Additional details are shown in FIG. 4. Conduits 88 connect first compartment 60 to manifold 61, with multiple conduits providing for good axial flow distribution in compartment 60. Similarly, conduits 89 connect second compartment 80 to manifold 81. Stator 14 has base 90 with bearings 91 and 92. The annular rotor 11 is supported on end disc 93, whose shaft 94 is supported by bearings 91 and 92. Motor 95 is coupled to shaft 94 to drive rotor 11. The rotor could alternatively rotate as an annular drum, supported by rollers at several angular positions about its rim and also driven at its rim so that no shaft would be required. A rim drive could be provided by a ring gear attached to the rotor, or by a linear electromagnetic motor whose stator would engage an arc of the rim. Outer circumferential seals 96 seal the ends of outer strip seals 42 and the edges of first valve surface 21, while inner circumferential seals 97 seal the ends of inner strip seals 44 and the edges of second valve surface 23. Rotor 11 has access plug 98 between outer wall 20 and inner wall 22, which provides access for installation and removal of the adsorbent in adsorbers 24.

Figure 5:
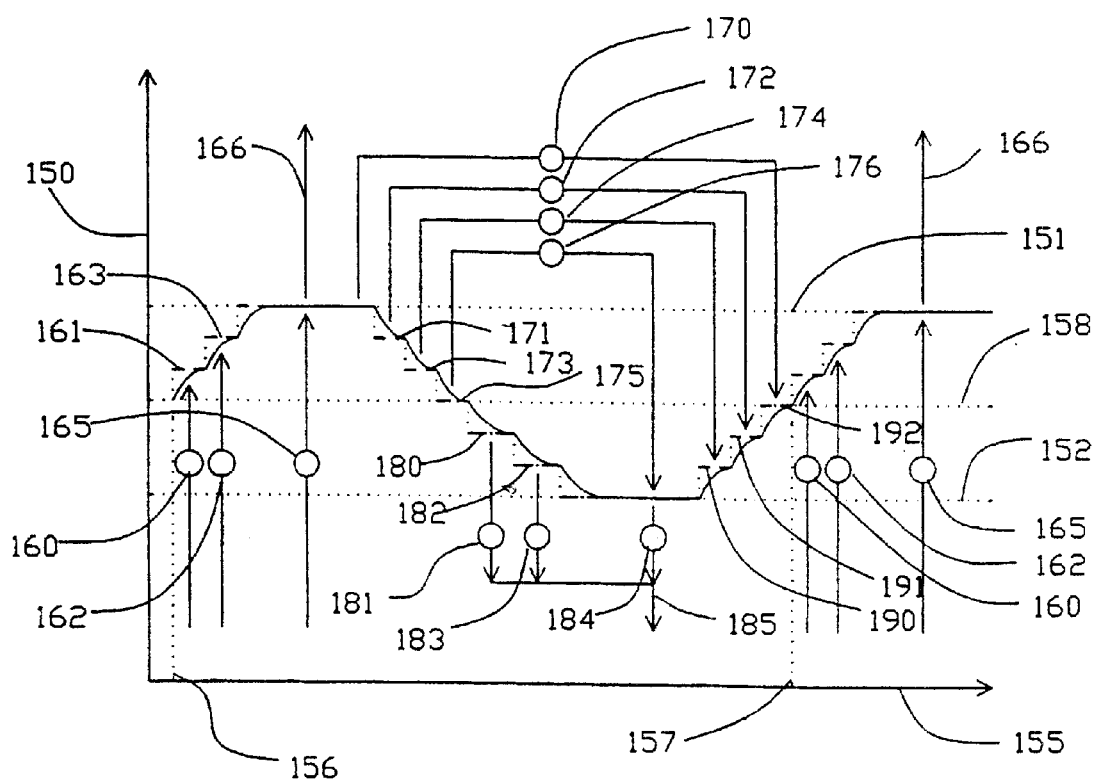
FIG. 5 shows a typical PSA cycle attainable with the present invention.
Figure 6:
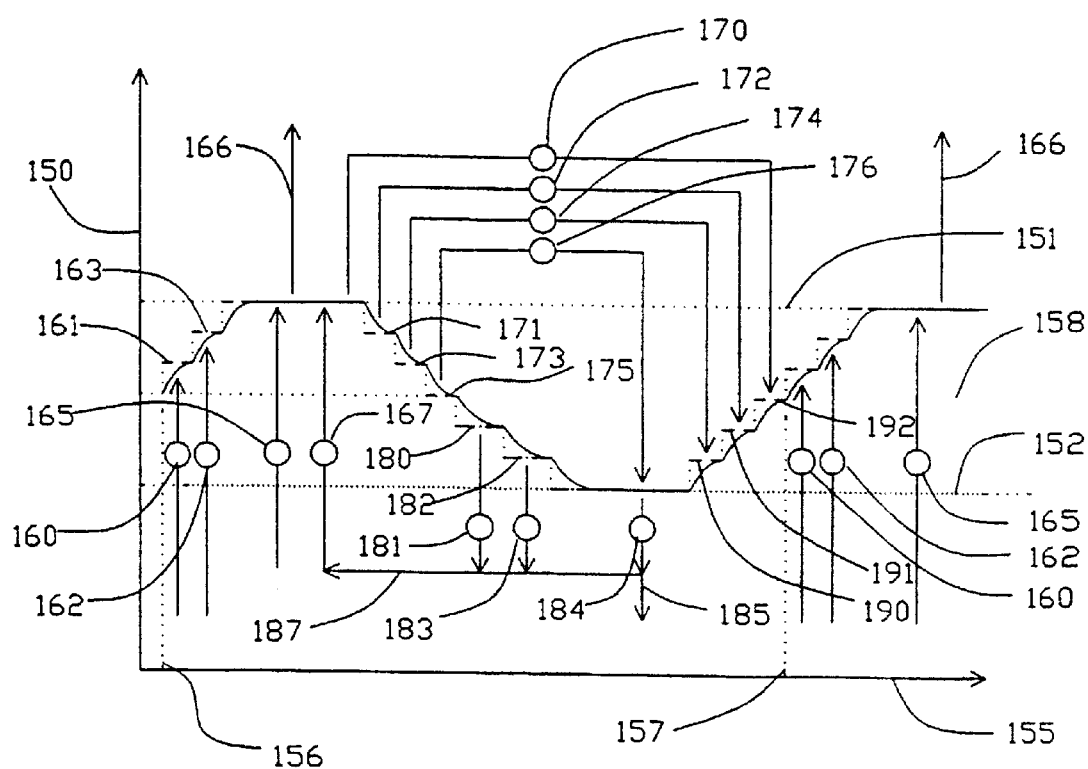
FIG. 6 shows one variation of the PSA cycle with heavy reflux, attainable with the present invention.

FIGS. 5 and 6

FIG. 5 shows a typical PSA cycle which would be obtained using the gas separation system according to the invention, while FIG. 6 shows a similar PSA cycle with heavy reflux recompression of a portion of the first product gas to provide a second feed gas to the process.

In FIGS. 5 and 6, the vertical axis 150 indicates the working pressure in the adsorbers and the pressures in the first and second compartments. Pressure drops due to flow within the adsorber elements are neglected. The higher and lower working pressures are respectively indicated by dotted lines 151 and 152.

The horizontal axis 155 of FIGS. 5 and 6 indicates time, with the PSA cycle period defined by the time interval between points 156 and 157. At times 156 and 157, the working pressure in a particular adsorber is pressure 158. Starting from time 156, the cycle for a particular adsorber (e.g. 24) begins as the first aperture 34 of that adsorber is opened to the first feed pressurization compartment 46, which is fed by first feed supply means 160 at the first intermediate feed pressure 161. The pressure in that adsorber rises from pressure 158 at time 157 to the first intermediate feed pressure 161. Proceeding ahead, first aperture passes over a seal strip, first closing adsorber 24 to compartment 46 and then opening it to second feed pressurization compartment 50 which is feed by second feed supply means 162 at the second intermediate feed pressure 163. The adsorber pressure rises to the second intermediate feed pressure.

First aperture 34 of adsorber 24 is opened next to first feed compartment 52, which is maintained at substantially the higher pressure by a third feed supply means 165. Once the adsorber pressure has risen to substantially the higher working pressure, its second aperture 35 (which has been closed to all second compartments since time 156) opens to light product compartment 70 and delivers light product 166.

In the cycle of FIG. 6, first aperture 34 of adsorber 24 is opened next to second feed compartment 54, also maintained at substantially the higher pressure by a fourth feed supply means 167. In general, the fourth feed supply means supplies a second feed gas, typically richer in the more readily adsorbed component than the first feed gas provided by the first, second and third feed supply means. In the specific cycle illustrated in FIG. 6, the fourth feed supply means 167 is a "heavy reflux" compressor, recompressing a portion of the heavy product back into the apparatus. In the cycle illustrated in FIG. 5, there is no fourth feed supply means, and compartment 54 could be eliminated or consolidated with compartment 52 extended over a wider angular arc of the stator.

While feed gas is still being supplied to the first end of adsorber 24 from either compartment 52 or 54, the second end of adsorber 24 is closed to light product compartment 70 and opens to first light reflux exit compartment 72 while delivering "light reflux" gas (enriched in the less readily adsorbed component, similar to second product gas) to first light reflux pressure let-down means (or expander) 170. The first aperture 34 of adsorber 24 is then closed to all first compartments, while the second aperture 35 is opened successively to (a) second light reflux exit compartment 74, dropping the adsorber pressure to the first cocurrent blowdown pressure 171 while delivering light reflux gas to second light reflux pressure letdown means 172, (b) third light reflux exit compartment 76, dropping the adsorber pressure to the second cocurrent blowdown pressure 173 while delivering light reflux gas to third light reflux pressure letdown means 174, and (c) fourth light reflux exit compartment 78, dropping the adsorber pressure to the third cocurrent blowdown pressure 175 while delivering light reflux gas to fourth light reflux pressure letdown means 176. Second aperture 35 is then closed for an interval, until the light reflux return steps following the countercurrent blowdown steps.

The light reflux pressure let-down means may be mechanical expanders or expansion stages for expansion energy recovery, or may be restrictor orifices or throttle valves for irreversible pressure let-down.

Either when the second aperture is closed after the final light reflux exit step (as shown in FIGS. 5 and 6), or earlier while light reflux exit steps are still underway, first aperture 34 is opened to first countercurrent blowdown compartment 56, dropping the adsorber pressure to the first countercurrent blowdown intermediate pressure 180 while releasing "heavy" gas (enriched in the more strongly adsorbed component) to first exhaust means 181. Then, first aperture 34 is opened to second countercurrent blowdown compartment 58, dropping the adsorber pressure to the first countercurrent blowdown intermediate pressure 182 while releasing heavy gas to second exhaust means 183. Finally reaching the lower working pressure, first aperture 34 is opened to heavy product compartment 60, dropping the adsorber pressure to the lower pressure 152 while releasing heavy gas to third exhaust means 184. Once the adsorber pressure has substantially reached the lower pressure while first aperture 34 is open to compartment 60, the second aperture 35 opens to purge compartment 80, which receives fourth light reflux gas from fourth light reflux pressure letdown means 176 in order to displace more heavy gas into first product compartment 60.

In FIG. 5, the heavy gas from the first, second and third exhaust means is delivered as the heavy product 185. In FIG. 6, this gas is partly released as the heavy product 185, while the balance is redirected as "heavy reflux" 187 to the heavy reflux compressor as fourth feed supply means 167. Just as light reflux enables an approach to high purity of the less readily adsorbed ("light") component in the light product, heavy reflux enables an approach to high purity of the more readily adsorbed ("heavy") component in the heavy product.

The adsorber is then repressurized by light reflux gas after the first and second apertures close to compartments 60 and 80. In succession, while the first aperture 34 remains closed at least initially, (a) the second aperture 35 is opened to first light reflux pressurization compartment 82 to raise the adsorber pressure to the first light reflux pressurization pressure 190 while receiving third light reflux gas from the third light reflux pressure letdown means 174, (b) the second aperture 35 is opened to second light reflux pressurization compartment 84 to raise the adsorber pressure to the second light reflux pressurization pressure 191 while receiving second light reflux gas from the second light reflux pressure letdown means 172, and (c) the second aperture 35 is opened to third light reflux pressurization compartment 86 to raise the adsorber pressure to the third light reflux pressurization pressure 192 while receiving first light reflux gas from the first light reflux pressure letdown means 170. Unless feed pressurization has already been started while light reflux return for light reflux pressurization is still underway, the process (as based on FIGS. 5 and 6) begins feed pressurization for the next cycle after time 157 as soon as the third light reflux pressurization step has been concluded.

The pressure variation waveform in each adsorber would be a rectangular staircase if there were no throttling in the first and second valves. In order to provide balanced performance of the adsorbers, preferably all of the apertures are closely identical to each other.

The rate of pressure change in each pressurization or blowdown step will be restricted by throttling in ports (or in clearance or labyrinth sealing gaps) of the first and second valve means, or by throttling in the apertures at first and second ends of the adsorbers, resulting in the typical pressure waveform depicted in FIGS. 5 and 6. Alternatively, the apertures may be opened slowly by the seal strips, to provide flow restriction throttling between the apertures and the seal strips, which may have a serrated edge (e.g. with notches or tapered slits in the edge of the seal strip) so that the apertures are only opened to full flow gradually. Excessively rapid rates of pressure change would subject the adsorber to mechanical stress, while also causing flow transients which would tend to increase axial dispersion of the concentration wavefront in the adsorber. Pulsations of flow and pressure are minimized by having a plurality of adsorbers simultaneously transiting each step of the cycle, and by providing enough volume in the function compartments and associated manifolds so that they act effectively as surge absorbers between the compression machinery and the first and second valve means.

It will be evident that the cycle could be generalized by having more or fewer intermediate stages in each major step of feed pressurization, countercurrent blowdown exhaust, or light reflux. Furthermore, in air separation or air purification applications, a stage of feed pressurization (typically the first stage) could be performed by equalization with atmosphere as an intermediate pressure of the cycle. Similarly, a stage of countercurrent blowdown could be performed by equalization with atmosphere as an intermediate pressure of the cycle.

FIG. 7

Figure 7:
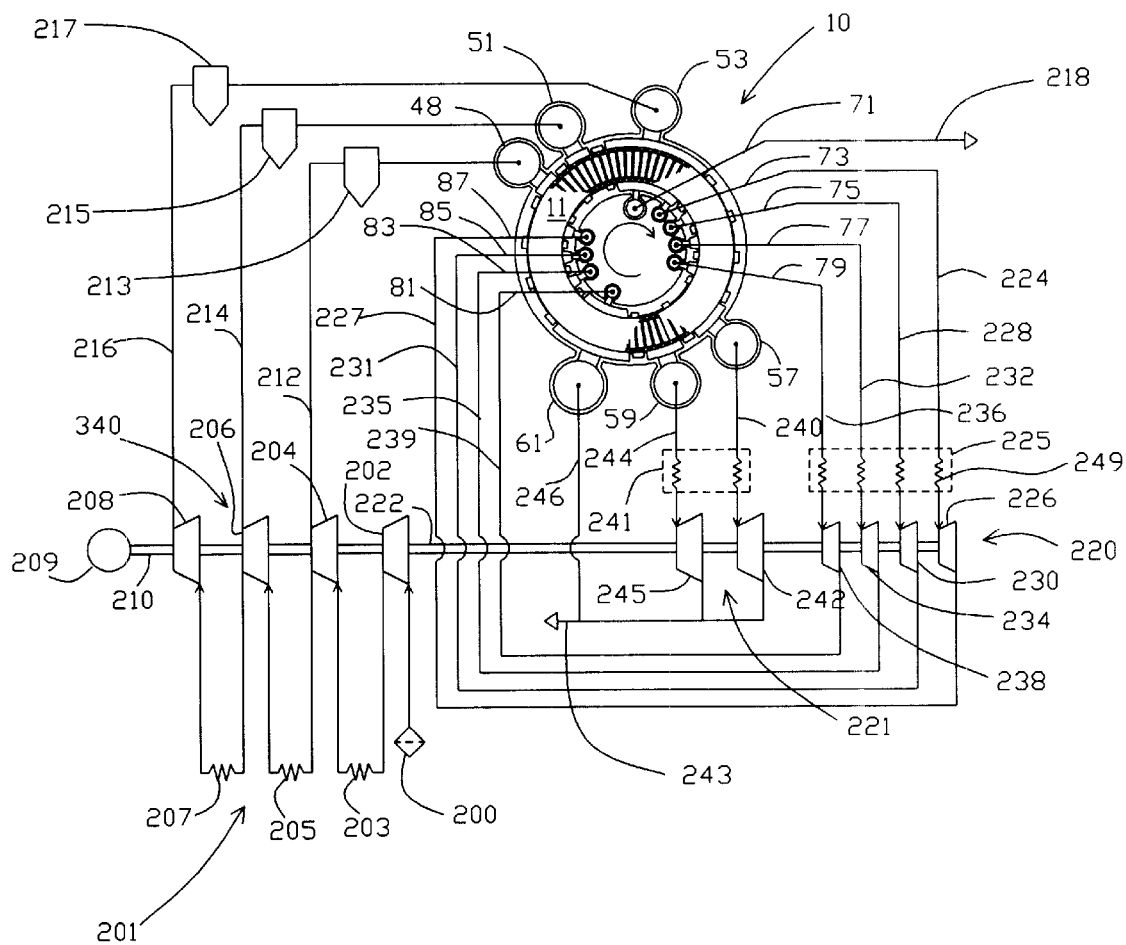
FIG. 7 shows a pressure swing adsorption apparatus according to the present invention, depicting the rotary module shown in FIG. 1 and a compression machine coupled to the rotary module.

FIG. 7 is a simplified schematic of a PSA system, in accordance with the present invention, for separating oxygen from air, using nitrogen-selective zeolite adsorbents.

The light product is concentrated oxygen, while the heavy product is nitrogen-enriched air usually vented as waste. The cycle lower pressure 152 is nominally atmospheric pressure. Feed air is introduced through filter intake 200 to a feed compressor 201. The feed compressor includes compressor first stage 202, intercooler 203, compressor second stage 204, second intercooler 205, compressor third stage 206, third intercooler 207, and compressor fourth stage 208. The feed compressor 201 as described may be a four stage axial compressor or centrifugal compressor with motor 209 as prime mover coupled by shaft 210, and the intercoolers are optional. With reference to FIG. 5, the feed compressor first and second stages are the first feed supply means 160, delivering feed gas at the first intermediate feed pressure 161 via conduit 212 and water condensate separator 213 to first feed pressurization manifold 48. Feed compressor third stage 206 is the second feed supply means 162, delivering feed gas at the second intermediate feed pressure 163 via conduit 214 and water condensate separator 215 to second feed pressurization manifold 51. Feed compressor fourth stage 208 is the third feed supply means 165, delivering feed gas at the higher pressure 151 via conduit 216 and water condensate separator 217 to feed manifold 53. Light product oxygen flow is delivered from light product manifold 71 by conduit 218, maintained at substantially the higher pressure less frictional pressure drops.

The apparatus of FIG. 7 includes energy recovery expanders, including light reflux expander 220 (here including four stages) and countercurrent blowdown expander 221 (here including two stages), coupled to feed compressor 201 by shaft 222. The expander stages may be provided for example as radial inflow turbine stages, as full admission axial turbine stages with separate wheels, or as partial admission impulse turbine stages combined in a single wheel.

Light reflux gas from first light reflux exit manifold 73 flows at the higher pressure via conduit 224 and heater 225 to first light pressure letdown means 170 which here is first light reflux expander stage 226, and then flows at the third light reflux pressurization pressure 192 by conduit 227 to the first light reflux return manifold 87. Light reflux gas from second light reflux exit manifold 75 flows at the first cocurrent blowdown pressure 171 via conduit 228 and heater 225 to second light reflux pressure letdown means 172, here the second expander stage 230, and then flows at the second light reflux pressurization pressure 191 by conduit 231 to the second light reflux return manifold 85. Light reflux gas from third light reflux exit manifold 77 flows at the second cocurrent blowdown pressure 173 via conduit 232 and heater 225 to third light reflux pressure letdown means 174, here the third expander stage 234, and then flows at the first light reflux pressurization pressure 190 by conduit 235 to the third light reflux return manifold 83. Finally, light reflux gas from fourth light reflux exit manifold 79 flows at the third cocurrent blowdown pressure 175 via conduit 236 and heater 225 to fourth light reflux pressure letdown means 176, here the fourth light reflux expander stage 238, and then flows at substantially the lower pressure 152 by conduit 239 to the fourth light reflux return manifold 81.

Heavy countercurrent blowdown gas from first countercurrent blowdown manifold 57 flows at first countercurrent blowdown intermediate pressure 180 by conduit 240 to heater 241 and thence to first stage 242 of the countercurrent blowdown expander 221 as first exhaust means 181, and is discharged from the expander to exhaust manifold 243 at substantially the lower pressure 152. Countercurrent blowdown gas from second countercurrent blowdown manifold 59 flows at second countercurrent blowdown intermediate pressure 182 by conduit 244 to heater 241 and thence to second stage 245 of the countercurrent blowdown expander 221 as second exhaust means 183, and is discharged from the expander to exhaust manifold 243 at substantially the lower pressure 152. Finally, heavy gas from heavy product exhaust manifold 61 flows by conduit 246 as third exhaust means 184 to exhaust manifold 243 delivering the heavy product gas 185 to be vented at substantially the lower pressure 152.

Heaters 225 and 241 raise the temperatures of gases entering expanders 220 and 221, thus augmenting the recovery of expansion energy and increasing the power transmitted by shaft 222 from expanders 220 and 221 to feed compressor 201, and reducing the power required from prime mover 209. While heaters 225 and 241 are means to provide heat to the expanders, intercoolers 203, 205 and 207 are means to remove heat from the feed compressor and serve to reduce the required power of the higher compressor stages. The intercoolers 203, 205, 207 are optional features of the invention.

If light reflux heater 249 operates at a sufficiently high temperature so that the exit temperature of the light reflux expansion stages is higher than the temperature at which feed gas is delivered to the feed manifolds by conduits 212, 214 and 216, the temperature of the second ends 35 of the adsorbers 24 may be higher than the temperature of their first ends 34. Hence, the adsorbers have a thermal gradient along the flow path, with higher temperature at their second end relative to the first end. This is an extension of the principle of "thermally coupled pressure swing adsorption" (TCPSA), introduced by Keefer in U.S. Pat. No. 4,702,903. Adsorber rotor 11 then acts as a thermal rotary regenerator, as in regenerative gas turbine engines having a compressor 201 and an expander 220. Heat provided to the PSA process by heater 225 assists powering the process according to a regenerative thermodynamic power cycle, similar to advanced regenerative gas turbine engines approximately realizing the Ericsson thermodynamic cycle with intercooling on the compression side and interstage heating on the expansion side. In the instance of PSA applied to oxygen separation from air, the total light reflux flow is much less than the feed flow because of the strong bulk adsorption of nitrogen. Accordingly the power recoverable from the expanders is much less than the power required by the compressor, but will still contribute significantly to enhanced efficiency of oxygen production.

Figure 8:
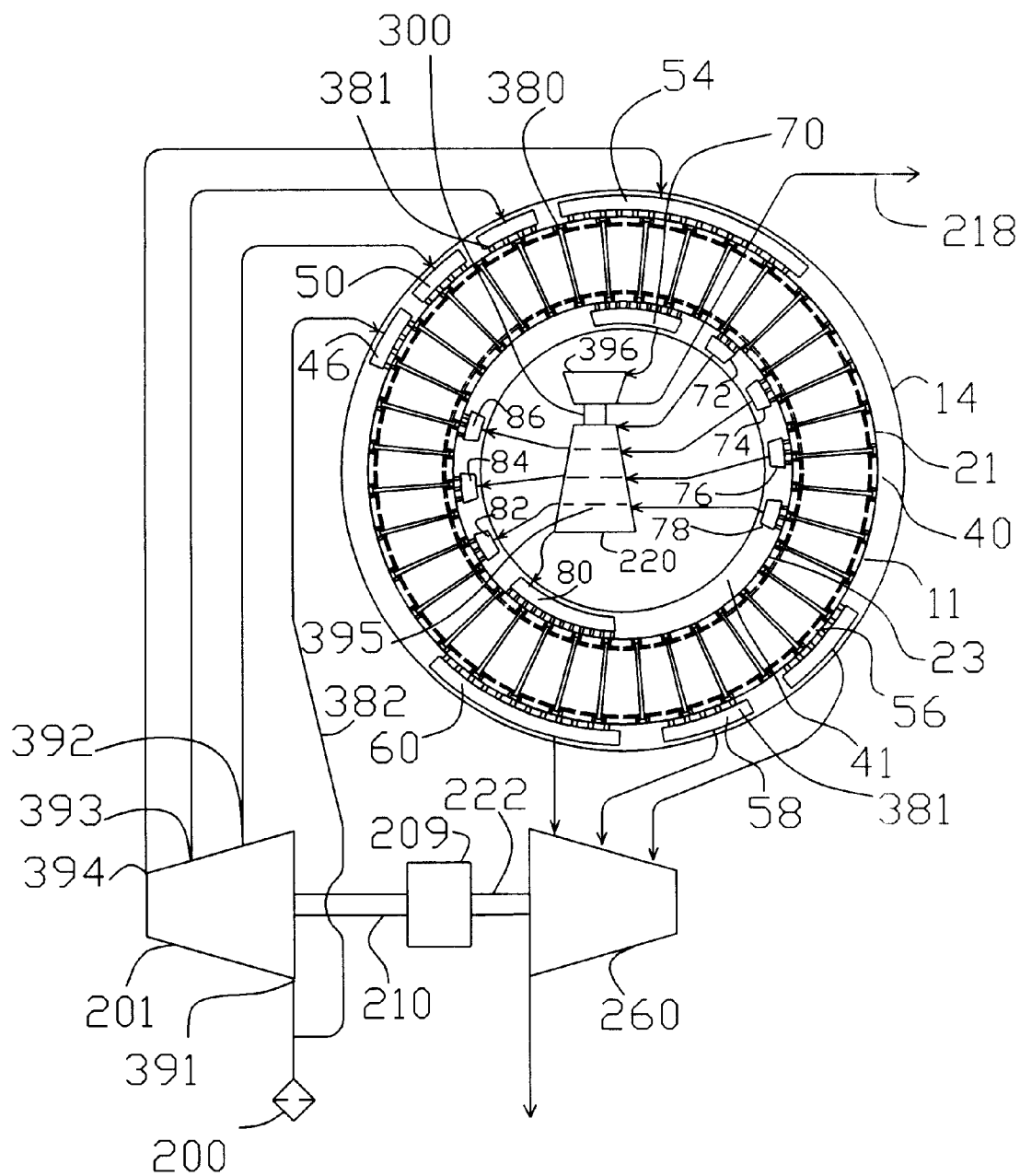
FIG. 8 shows a radial-flow-configured rotary PSA module, with the compression machine deleted for clarity.

If high energy efficiency is not of highest importance, the light reflux expander stages and the countercurrent blowdown expander stages may be replaced by restrictor orifices or throttle valves for pressure letdown. The schematic of FIG. 7 shows a single shaft supporting the compressor stages, the countercurrent blowdown or exhaust expander stages, and the light reflux stages, as well as coupling the compressor to the prime mover. However, it should be understood that separate shafts and even separate prime movers may be used for the distinct compression and expansion stages within the scope of the present invention.
FIG. 8

FIG. 8 shows a radial flow rotary PSA module 300 in which the first and second valve surface 21, 23 are respectively provided as hard-faced ported surfaces on the first and second valve stators 40 and 41. Sliding seals 380 are provided on rotor 11 between each adsorber 24 and its neighbours, to engage both valve surfaces 21, 23 in fluid sealing contact. Seals 380 may have a wear surface of a suitable composite material based on PTFE or carbon, and should be compliantly mounted on rotor 11 so as to compensate for wear, deflections and misalignment. Ports 381 may be sized, particularly at the leading edge of each compartment, to provide controlled throttling for smooth pressure equalization between adsorbers and that compartment, as each adsorber in turn is opened to that compartment.

Split stream vacuum pump 260 receives the countercurrent blowdown and exhaust flow in three streams receiving exhaust gas at incrementally reduced pressures from countercurrent blowdown compartment 56, compartment 58 and compartment 60. The combined exhaust gas is discharged as heavy product gas. In this example, initial feed pressurization is performed from atmosphere, so a first feed pressurization conduit 382 admits feed air directly from inlet filter 200 to first feed pressurization compartment 46 at substantially atmospheric pressure. The first discharge port of feed compressor 201 now communicates to second feed pressurization compartment 50. The compressor is shown as a split stage machine with inlet 391, and three discharges 392, 393 and 394 at incrementally higher pressures.

To achieve light reflux pressure letdown with energy recovery, a split stream light reflux expander 220 is provided to provide pressure let-down of four light reflux stages with energy recovery. The light reflux expander 220 provides pressure let-down for each of four light reflux stages. The stages may optionally be compartmentalized within the light reflux expander 220 to minimize mixing of gas concentration between the stages. The light product purity will tend to decline from the light reflux stages of higher pressure to those of lower pressure, so that a desirable stratification of the light reflux can be maintained if mixing is avoided.

Light reflux expander 220 is coupled to drive light product pressure booster compressor 396. Compressor 396 receives the light product from compartment 70, and delivers light product (compressed to a delivery pressure above the higher pressure of the PSA cycle) from delivery conduit 218. Since the light reflux and light product are both enriched oxygen streams of approximately the same purity, expander 220 and light product compressor 396 may be hermetically enclosed in a single housing similar to a turbocharger.

FIG. 9

Figure 9:
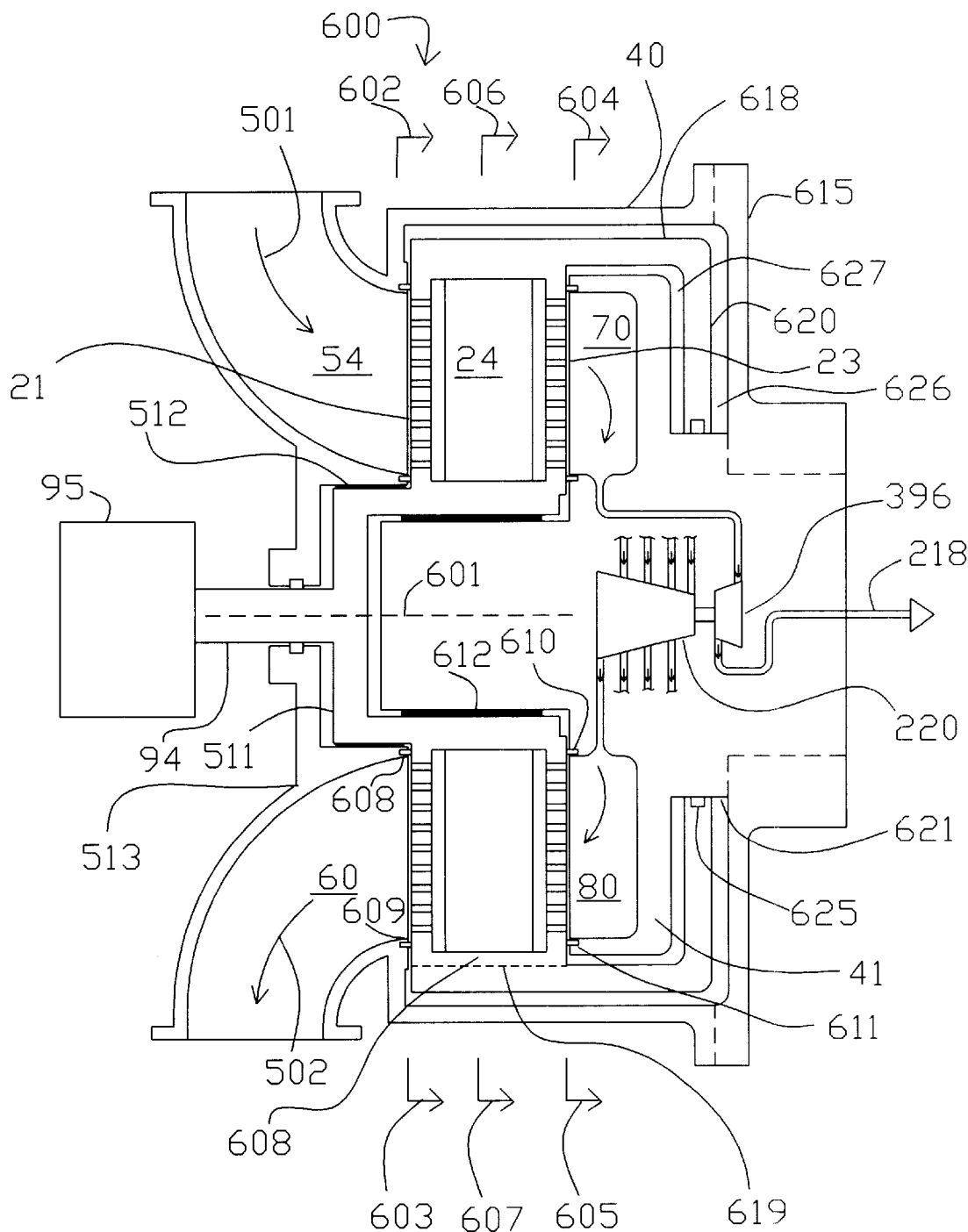
FIG. 9 shows an axial-flow-configured rotary PSA module, with the compression machine deleted for clarity.

FIG. 9 is an axial sectional view of an axial flow rotary PSA module 600 for small scale oxygen production. The view is taken through compartments 54 and 70 at the higher pressure, and compartments 60 and 80 at the lower pressure. The flow path in adsorbers 24 is now parallel to axis 601. A better understanding will be obtained from FIGS. 10 and 11, which are cross sections of module 600 in the planes respectively defined by arrows 602–603 and 604–605.

The adsorber rotor 11 contains the "N" adsorbers 24 in adsorber wheel 608, and revolves between the first valve stator 40 and the second valve stator 41. Compressed feed air is supplied to compartment 54 as indicated by arrow 501, while nitrogen enriched exhaust gas is exhausted from compartment 60 as indicated by arrow 502.

At the ends of rotor 11, circumferential seals 608 and 609 bound first sealing face 21, and circumferential seals 610 and 611 bound second sealing face 23. The sealing faces are flat discs. The circumferential seals also define the ends of seals between the adsorbers, or alternatively of dynamic seals in the sealing faces between the stator compartments. Rotor 11 has a stub shaft 511 supported by bearing 512 in first bearing housing 513, which is integral with first valve stator 40. Second valve stator 41 has a stub shaft engaging the rotor 11 with guide bushing 612.

A flanged cover plate 615 is provided for structural connection and fluid sealing enclosure between the first valve stator 40 and the second valve stator 41. Rotor 11 includes seal carrier 618 attached at joint 619 to adsorber wheel 608, and extending between the back of second valve stator 41 and cover plate 615 to sealing face 621 which is contacted by dynamic seal 625. Seal 625 prevents contamination of the light product gas by leakage from chamber 626 adjacent the first valve sealing face 21 to chamber 627 adjacent the second valve sealing face 23.

Seal 625 needs to be tight against leakage that could compromise product purity. By manufacturing this seal to a smaller diameter than the valve faces outer diameter, frictional torque from this seal is greatly reduced than if this seal were at the full rotor diameter. The circumferential perimeter exposed to leakage is also reduced. As in FIG. 8, a split stream light reflux expander 220 with close-coupled light product compressor 396, may be installed inside the light valve stator.

Figure 10:
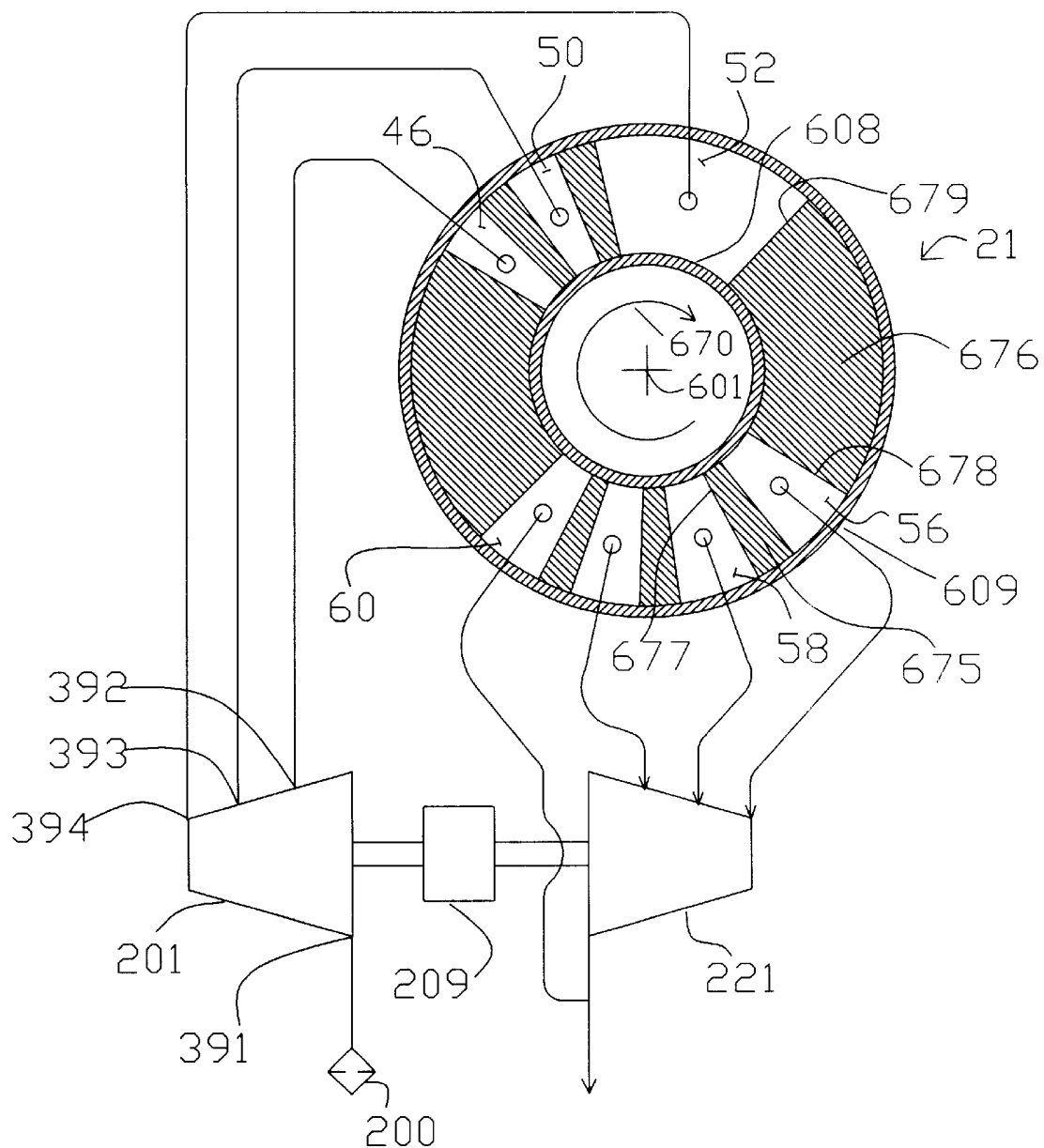
FIG. 10 shows the first valve face of the rotary PSA module shown in FIG. 9.
Figure 11:
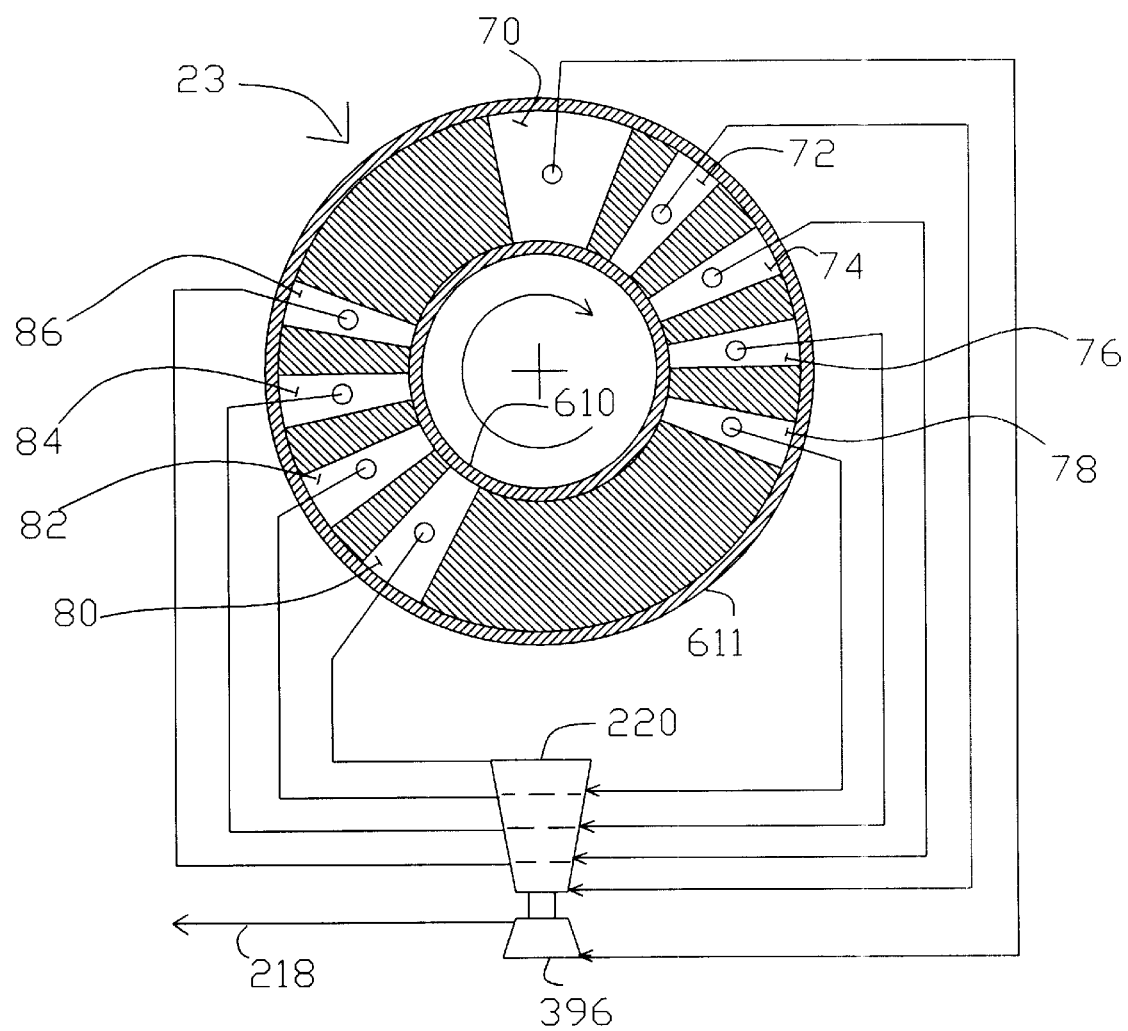
FIG. 11 shows the second valve face of the rotary PSA modules shown in FIG. 9.

FIGS. 10 and 11

FIG. 10 shows the first valve face 21 of the axial flow rotary PSA module 600 shown in FIG. 9, at section 602–603, with fluid connections to a split stream feed compressor 201 and a split stream countercurrent blowdown expander 221. FIG. 11 shows the second valve face 23 of the axial flow rotary PSA module 600 shown in FIG. 9, at section 604–605, with fluid connections to a split stream light reflux expander 220 and light product booster compressor 396.

Arrow 670 indicates the direction of rotation by adsorber rotor 11. The open area of valve face 21 ported to the feed and exhaust compartments is indicated by clear angular segments 46, 50, 52, 56, 58, 60 corresponding to those compartments, between circumferential seals 608 and 609. The closed area of valve face 21 between compartments is indicated by cross-hatched sectors 675 and 676. Similarly, the open area of valve face 23 ported to the light reflux exit and return compartments is indicated by clear angular segments 70, 72, 74, 76, 78, 80, 82, 84, 86 corresponding to those compartments, while the closed are of valve face 23 between the light reflux and return compartments is indicated by the cross-hatched sectors.

Typical closed sector 675, shown in FIG. 10, provides a transition for an adsorber, between being open to compartment 56 and open to compartment 58. Gradual opening is provided at the leading edges 677 and 678 of compartments, so as to achieve gentle pressure equalization of an adsorber being opened to a new compartment. Much wider closed sectors (e.g. 676) are provided to substantially close flow to or from one end of the adsorbers when pressurization or blowdown is being performed from the other end.

Sealing between compartments at typical closed sectors (e.g. 675) may be provided by rubbing seals on either stator or rotor against a ported hard-faced sealing counter face on the opposing rotor or stator, or by narrow gap clearance seals on the stator with the area of the narrow sealing gap defined by the cross hatched area of the nominally closed surface. Rubbing seals may be provided as radial strip seals, with a self-lubricating solid material such as suitable PTFE compounds or graphite, or as brush seals in which a tightly packed brush of compliant fibers rubs against the counter face.

If the rubbing seals are on the rotor (between adjacent adsorbers), cross-hatched sectors 675 and 676 would be non-ported portions of the hard-faced sealing counter face on the stator. If the rubbing seals are on the stator, the ported hard-faced counter face is on the rotor valve face. Those rubbing seals could be provided as full sector strips for narrow closed sectors (e.g. 675). For the wider closed sectors (e.g. 676), narrow radial rubbing seals may be used as the edges 678 and 679, and at intervals between those edges, to reduce friction in comparison with rubbing engagement across the full area of such wide sectors.

Clearance seals are attractive, especially for larger scale modules with a very large number "N" of adsorbers in parallel. The leakage discharge coefficient to or from the clearance gap varies according to the angular position of the adsorber, thus providing gentle pressure equalization as desired. The clearance gap geometry is optimized in typical nominally closed sectors (e.g. 675) so that the leakage in the clearance gap is mostly used for adsorber pressure equalization, thus minimizing through leakage between compartments. Preferably, the clearance gap is tapered in such sectors 675 to widen the gap toward compartments being opened, so that the rate of pressure change in pressure equalization is close to linear and rubbing friction is reduced. For wide closed sectors (e.g. 676) the clearance gap would be relatively narrow to minimize flows at that end of adsorbers passing through those sectors.

For all types of valve face seals described above, it is preferable that consistent performance be achieved over time, and that all "N" adsorbers experience the same flow pattern after all perturbations from seal imperfections. This consideration favours placing rubbing seals on the stator so that any imperfections are experienced similarly by all adsorbers. If the seals are mounted on the rotor between adsorbers, it is preferable that they are closely identical and highly reliable to avoid upsetting leakages between adjacent adsorbers.

To compensate for misalignment, thermal distortion, structural deflections and wear of seals and bearings, the sealing system should have a suitable self-aligning suspension. Thus, rubbing seal or clearance seal elements may be supported on elastomeric supports, bellows or diaphragms to provide the self-aligning suspension with static sealing behind the dynamic seal elements. Rubbing seals may be energized into sealing contact by a combination of elastic preload and gas pressure loading.

Clearance seals require extremely accurate gap control, which may be established by rubbing guides. However, in the preferred embodiments, discussed below, gap control for blowdown compartments is achieved through a self-regulating seal in which the correct gap is maintained by a balance between gas pressure in the gap of a clearance seal segment, and the pressures of adjacent blowdown compartments loading the seal behind that segment. For pressurization compartments, gap control is achieved through a self-regulating seal in which the correct gap is maintained by a balance between gas pressure in the gap of a clearance seal segment, and an intermediate pressure loading the seal behind that segment, with the intermediate pressure being the average of the pressure of the flow paths approaching the clearance seal segment and the pressure of flow paths leaving the clearance seal segment. The preferred embodiments of the self-regulating clearance seals are discussed below.

Figure 12A:
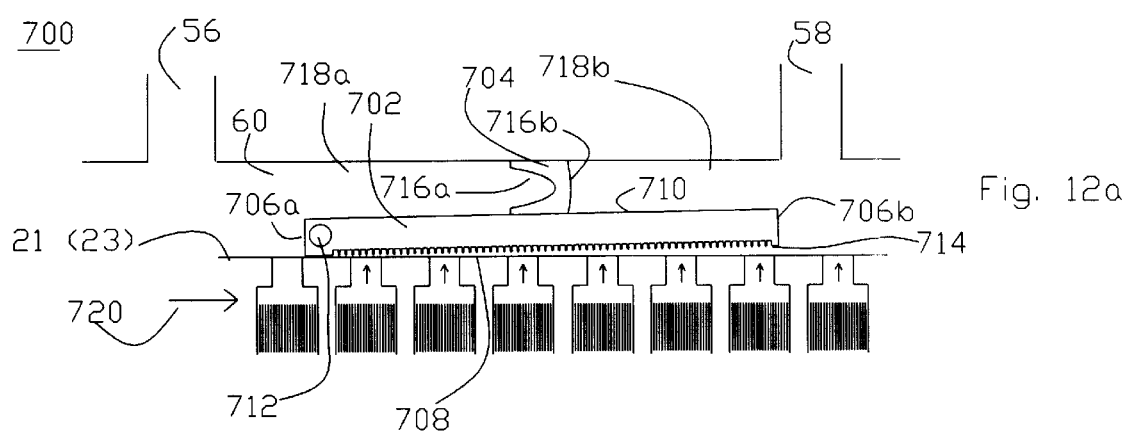
FIG. 12a is a sectional view of a self-regulating clearance seal for use with the blowdown compartments of an axial-flow-configured rotary PSA module, such as the PSA module shown in FIG. 9.
Figure 12B:
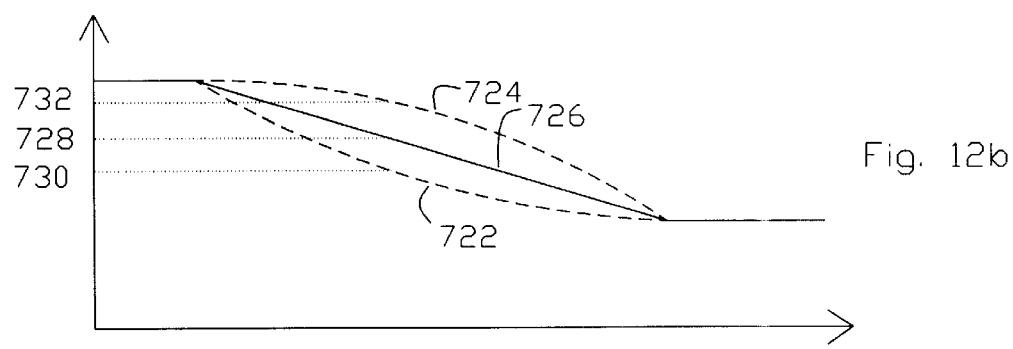

FIGS. 12*a*, 12*b*

FIG. 12*a* shows a self-regulating clearance seal 700 for use with the countercurrent blowdown compartments 56, 58, 60 and the cocurrent blowdown compartments 72, 74, 76, 78 of an axial-flow-configured rotary PSA module, such as the PSA module 600 shown in FIG. 9. The self-regulating clearance seal 700 comprises a sealing element 702, and a resilient biasing element 704 coupled to the sealing element 702. The sealing element 702 is interposed between the first valve face 21 of the rotor 11 and the corresponding stator valve face of the stator 14, when used in conjunction with countercurrent blowdown compartments 56, 58, 60, or is interposed between the second valve face 23 of the rotor 11 and the corresponding stator valve face of the stator 14, when used in conjunction with the cocurrent blowdown compartments 72, 74, 76, 78. Sealing elements 702 are positioned along the stator valve face, with each sealing element 702 being positioned between a pair of adjacent blowdown compartment, such as between the blowdown compartments 56, 58 shown in FIG. 12*a*. However, it should be understood that the sealing element 702 may be positioned between any blowdown compartments, or proximate to any first gas flow conduit which facilitates pressure blowdown of a second gas flow conduit moving past the first gas flow conduit.

Each sealing element 702 comprises an elongate slipper having first and second opposite ends 706*a*, 706*b*, a substantially planar sealing face 708 extending between the opposite ends 706, and an opposing second face 710 also extending between the opposite ends 706 but positioned opposite the sealing face 708. The sealing element 702 is positioned between the rotor valve face 21 (or the rotor valve face 23) and the corresponding stator valve face, with the first end 706*a* being positioned adjacent one of the blowdown compartments, such as the blowdown compartment 56, and with the second end 706*b* being proximate to the adjacent blowdown compartment, such as the blowdown compartment 58.

The first end 706*a* of the sealing element 702 is pivotally coupled to the rotor valve face 21 (or rotor valve face 23) through a bearing 712 positioned adjacent one side edge of the sealing element 702, and which extends laterally outwards from the sealing element 702 and engages a corresponding race on the rotor 11. A similar bearing 712 (not shown) is positioned on the opposite side edge of the sealing element 702 and engages a corresponding race on the rotor 11. As will be described below, with this arrangement, a variable clearance gap 714 is maintained between the sealing face 708 and the rotor valve face 21 (or rotor valve face 23) so as to allow the gas flow rate through the apertures 34 (or the apertures 35) of the rotor 11 to vary as the height of the clearance gap 714 between the sealing face 708 and the rotor valve face is varied. However, the clearance gap 714 at the first end 706*a* is maintained substantially constant, and is sized to minimize gas flows between adjacent blowdown compartments, such as between the blowdown compartment 56 and the blowdown compartment 58.

As will be appreciated, by providing bearings 712 at the first end 706*a* of the sealing element 702, the clearance gap 714 at the first end 706*a* of the sealing element 702 is substantially independent of the degree of roundness of the rotor valve face. As a result, friction between the sealing face 708 and the rotor valve face 21, 23 is less than if the first end 706*a* actually contacted the rotor valve face 21, 23. However, the bearings 712 are not essential features of the invention. For instance, in one variation (not shown), the sealing element 702 includes a pair of protuberances integrally formed with the sealing element 702 and which extend laterally outwards from the side edges of the sealing element 702 for engagement with the bearing races on the rotor 11. In another variation (not shown), the bearings 712 are replaced with a single rod which extends through the sealing element 702 between the side edges for engagement with the bearing races on the rotor 11. Further, in applications where precise control over the clearance gap 714 at the first end 706*a* is not critical, or where the rotor valve face is precision machined, the first end 706*a* may be coupled to the stator 14.

The biasing element 704 comprises a resilient element including a first side wall 716a, and a second side wall 716b opposite the first side wall 716a. The biasing element 704 is positioned equidistantly between the first and second ends 706a, 706b and extends between the opposing face 710 and the stator valve face between adjacent blowdown compartments. The biasing element 704 prevents the sealing element 702 from rotating with the rotor 11 as the apertures 34 (or the apertures 35) of the rotor 11 move past the sealing face 708, and urges the sealing face 708 towards the rotor valve face. Further, since the gas flow rate through the apertures 34, 35 of the rotor 11 is dependent upon the height of the clearance gap 714, the first side wall 716a of the resilient biasing element 704 is concave so to allow the height of the clearance gap 714 to be varied. However, to reduce friction between the sealing face 708 and the rotor valve face, preferably the biasing element 704 does not press the sealing face 708 against the rotor valve face. The biasing element 704 is sized so the sealing face 708 tapers away from the rotor valve face from the first end 706a towards the second end 706b, so that the clearance gap 714 is greater adjacent the second end 706b than adjacent the first end 706a. As will become apparent, this feature allows for a gradual pressure letdown for the gas flowing from the flow path ends 30, 32 of the adsorbers 24 as the corresponding apertures 34, 35 of the rotor 11 traverse the sealing face 708.

A first compartment 718a is provided between the first side wall 716a of each biasing element 704, the portion of the stator valve face extending between the first side wall 716a and the blowdown compartment immediately adjacent thereto (blowdown compartment 56), and the portion of the opposing face 710 extending between the first side wall 716a and the first end 706a. A second compartment 718b is provided between the second side wall 716b of each biasing element 704, the portion of the stator valve face extending between the second side wall 716b and the blowdown compartment immediately adjacent thereto (blowdown compartment 58), and the portion of the opposing face 710 extending between the second side wall 716b and the second end 706b. The second compartment 718b communicates with a first compartment 718a associated with the adjacent sealing element. The operation of the clearance seal 700 will now be described with reference to FIGS. 12a, 12b.

In operation, the rotor rotates in the direction of the arrow denoted by reference numeral 720. Since clearance seals 700 are positioned along the circumference of the stator valve face between adjacent blowdown compartments, the first end 706a of each sealing element 702 will be maintained at the pressure level of one of the blowdown compartments, and the second end 706b of each sealing element 702 will be maintained at the pressure level of the adjacent blowdown compartment. In the example shown in FIG. 12a, the first end 706a is maintained at the pressure level of the blowdown compartment 56, and the second end 706b is maintained at the pressure level of the blowdown compartment 58. Accordingly, when an aperture 34, 35 approaches the first end 706a of the sealing element 702, the gas flowing from the aperture 34, 35 is equalized to the pressure of the blowdown compartment 56. As the apertures 34, 35 pass the first end 706a and approach the second end 706b, the clearance gap 714 increases, thereby allowing the rate of gas flow from the aperture 34, 35 to increase and the pressure at the corresponding flow path end 30, 32 of the adsorber 24 to decrease.

Preferably, the pressure transition profile between the first blowdown compartment (blowdown compartment 56) and the second blowdown compartment (blowdown compartment 58) is substantially linear so as to maintain equilibrium between the adsorbent material and the mass transfer front of the gas. However, as discussed above, the rate of gas flow (and hence the rate of pressure blowdown) depends on the height of the clearance gap 714. For instance, in a conventional clearance seal, if the clearance gap 714 increased too rapidly, the pressure transition profile would normally have the concave shape (denoted by reference numeral 722) shown in FIG. 12b, whereas if the clearance gap 714 increased too slowly, the pressure transition profile would normally have the convex shape (denoted by reference numeral 724). However, as will now be explained, with the present invention, the height of the clearance gap 714 automatically adjusts to obtain the linear pressure transition profile (denoted by reference numeral 726).

Since each biasing element 704 is positioned equidistantly between the first and second ends 706a, 706b, the first and second compartments 718 are of equal size. Therefore, as the clearance seals 700 are positioned along the stator valve face between adjacent blowdown compartments, the pressure acting against the opposing face 710 at the position occupied by the biasing element 704 is equal to the average of the pressure of the blowdown compartment 56 and the blowdown compartment 58 (as shown by the reference numeral 728). As a result, if the clearance gap 714 increased too rapidly, the pressure (as shown by reference numeral 730) at the sealing face 708 at the same position will be less than the average pressure 728, causing a moment to be developed about the first end 706a tending to force the clearance gap 714 to narrow. The narrowing of the clearance gap 714 will cause a flattening of the pressure transition profile. The clearance gap 714 (and the angle between the sealing face 708 and the rotor face) will continue to narrow in response to the pressure differential between the compartments 716 and the apertures 34,35 until the pressure 730 equals the pressure 728, at which point a linear pressure transition profile will be obtained.

Conversely, if the clearance gap 714 increased too slowly, the pressure (as shown by reference numeral 732) at the sealing face 708 at the position of the biasing element 704 will be greater than the average pressure 728, causing an opposite moment to be developed about the first end 706a tending to force the clearance gap 714 to widen. The widening of the clearance gap 714 again will cause a flattening of the pressure transition profile. The clearance gap 714 (and the angle between the sealing face 708 and the rotor face) will continue to widen in response to the pressure differential between the compartments 718 and the apertures 34, 35 until the pressure 732 equals the pressure 728, at which point a linear pressure transition profile again will be obtained.

Numerous variations of the foregoing clearance seal will be apparent. In one such variation, shown in FIG. 12a, the sealing face 708 includes a plurality of passages, provided as a labyrinth, for increasing the flow resistance for a given channel gap 714 height. In another variation (not shown), rather than the sealing face 708 being planar, the sealing face 708 includes a plurality of planar stepped portions, so that the sealing face 708 tapers away from the rotor face over a plurality of steps and the flow resistance is increased for a given angle of deflection of the sealing element 702. In yet another variation, the biasing element 704 is positioned at an off-centre position so as to provide a controlled non-linear pressure transition profile.

In still another variation, the clearance seals 700 are used to provide sealing for closed sectors, such as the closed axial flow sectors 675, 676 shown in FIG. 10. In this latter variation, the bearings 712 are replaced with fasteners which rigidly secure the first end 706a of the sealing element 702 to a race on the rotor valve face 21 (or rotor valve face 23) so as to prevent variations in the height of the clearance gap 714. Further, the first and second compartments 718a, 718b do not communicate with any blowdown compartments, but are pressurized to the pressure of the apertures 34, 35. As a result, the sealing faces 708 are urged towards the rotor face so as to limit the gas flow through the apertures 34, 35.

Figure 13A:
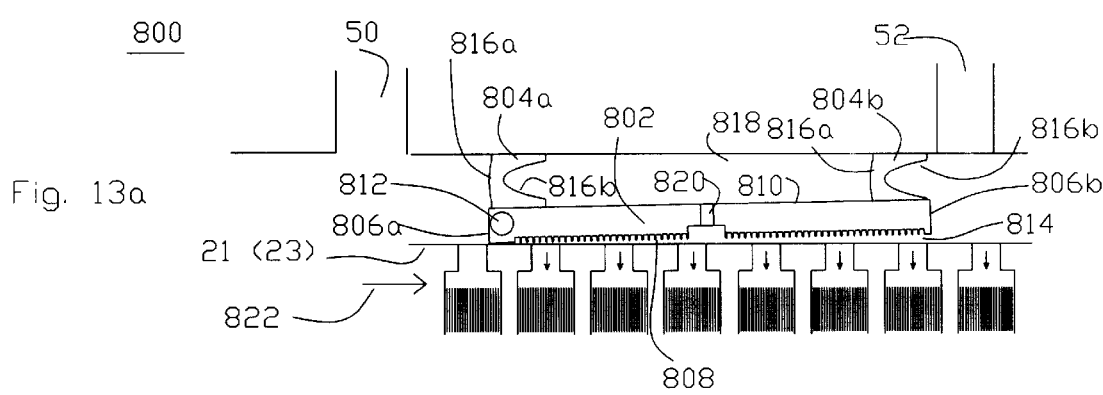
FIG. 13a is a sectional view of a self-regulating clearance seal for use with the pressurization compartments of an axial-flow-configured rotary PSA module, such as the PSA module shown in FIG. 9.
Figure 13B:
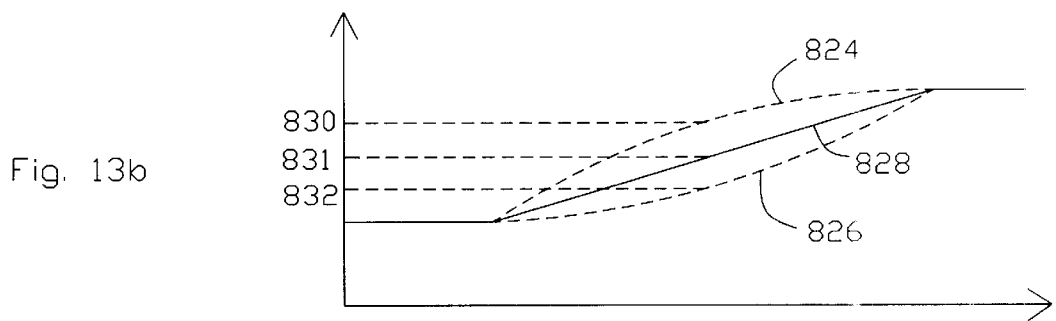

FIGS. 13a, 13b

FIG. 13a shows a self-regulating clearance seal 800 for use with the pressurization compartments 46, 50, 52, 54 or the light reflux return compartments 82, 84, 86 of an axial-flow configured rotary PSA module, such as the PSA module 600 shown in FIG. 9. The clearance seal 800 may even be used in connection with heavy reflux return compartments if desired.

The self-regulating seal 800 is substantially similar to the self-regulating seal 700, comprising a sealing element 802, and first and second resilient biasing elements 804a, 804b coupled to the sealing element 802. The sealing element 802 is interposed between the first valve face 21 of the rotor 11 and the corresponding stator valve face of the stator 14, when used in conjunction with pressurization compartments 46, 50, 52, 54, or is interposed between the second valve face 23 of the rotor 11 and the corresponding stator valve face of the stator 14, when used in conjunction with the light reflux return compartments 82, 84, 86. Sealing elements 802 are positioned along the stator valve face, with each sealing element 802 being positioned between a pair of adjacent pressurization or reflux return compartment, such as between the pressurization compartments 50, 52 shown in FIG. 12a. However, the sealing elements 702 may be positioned between any pressurization compartments, or proximate to any first gas flow conduit which facilitates pressurization of a second gas flow conduit moving past the first gas flow conduit. Alternately, the clearance seals 800 may be used without any pressurization compartments, to provide sealing for closed sectors.

Each sealing element 802 comprises an elongate slipper having first and second opposite ends 806a, 806b, a substantially planar sealing face 808 extending between the opposite ends 806, and an opposing second face 810 also extending between the opposite ends 806 but positioned opposite the sealing face 808. The sealing element 802 is positioned between the rotor valve face 21 (or the rotor valve face 23) and the corresponding stator valve face, with the first end 806a being positioned adjacent one of the pressurization/reflux return compartments, such as the pressurization compartment 50, and with the second end 806b being proximate to the adjacent pressurization/reflux return compartment, such as the pressurization compartment 52. The first end 806a of the sealing element 802 is pivotally coupled to the rotor valve face 21 (or rotor valve face 23) through bearings 812, as with the self-regulating seal 700.

Each biasing element 804 comprises a resilient element including a first side wall 816a, and a second side wall 816b opposite the first side wall 816a. The biasing elements 804 are positioned at opposite ends of the sealing element 802, with the first biasing element 804a being positioned adjacent the first end 806a, and the second biasing element 804b being positioned adjacent the second end 806b. Each pair of biasing elements 804a, 804b extend between the opposing face 810 and the stator valve face between a pair of adjacent pressurization/reflux return compartments. The biasing elements 804 prevent the sealing element 802 from rotating with the rotor 11 as the apertures 34 (or the apertures 35) of the rotor 11 move past the sealing face 808, and urge the sealing face 808 towards the rotor valve face. Further, since the gas flow rate through the apertures 34, 35 of the rotor 11 is dependent upon the height of the clearance gap 814, the second side wall 816b of each resilient biasing element 804 is concave so to allow the height of the clearance gap 814 to be varied. However, to reduce friction between the sealing face 808 and the rotor valve face, preferably the biasing elements 804 do not press the sealing face 808 against the rotor valve face. The biasing elements 804 are also sized so the sealing face 808 tapers away from the rotor valve face from the first end 806a towards the second end 806b, so that the clearance gap 814 between the sealing face 808 and the rotor face is greater adjacent the second end 806b than adjacent the first end 806a. As will be apparent, this feature provides a gradual pressure increase for the gas flowing into the flow path ends 30, 32 of the adsorbers 24 as the corresponding apertures 34, 35 of the rotor 11 traverse the sealing face 808.

A compartment 818 is provided between the second side wall 816b of the first biasing element 804a, the first side wall 816a of the second biasing element 804a, and the portions of the stator valve face and the opposing face 810 extending therebetween. The compartment 818 communicates with the pressurization/reflux return compartment adjacent the second end 806b (pressurization compartment 52) through an aperture 820 provided in the sealing element 802. The aperture 820 is positioned equidistantly between the first and second ends 806a, 806b and extends between the sealing face 808 and the opposing face 810. The operation of the clearance seal 800 will now be described with reference to FIGS. 13a, 13b.

In operation, the rotor rotates in the direction of the arrow denoted by reference numeral 822. Since clearance seals 800 are positioned along the circumference of the stator valve face between adjacent pressurization/reflux return compartments, the first end 806a will be exposed to a pressure from one of the pressurization/reflux return compartments, and the second end 806b will be exposed to a greater pressure from the adjacent pressurization/reflux return compartment. In the example shown in FIG. 13a, the first end 806a is exposed to a pressure from the pressurization compartment 50, and the second end 806b is exposed to a greater pressure from the pressurization compartment 52. Accordingly, when an aperture 34, 35 approaches the first end 806a of the sealing element 802, the gas entering the aperture 34, 35 is equalized to the pressure of the pressurization compartment 50. As the apertures 34, 35 pass the first end 806a and approach the second end 806b, the clearance gap 814 increases, thereby allowing the rate of gas flow into the aperture 34, 35 to increase and the pressure at the corresponding flow path end 30, 32 of the adsorber 24 to increase.

Preferably, the pressure transition profile between the first pressurization/reflux return compartment (pressurization compartment 50) and the second pressurization/reflux return compartment (pressurization compartment 52) is substantially linear so as to maintain equilibrium between the adsorbent material and the mass transfer front of the gas. However, as discussed above, the rate of gas flow (and hence the rate of pressure blowdown) depends on the height of the clearance gap 814. For instance, in a conventional clearance seal, if the clearance gap 814 increased too rapidly, the pressure transition profile would normally have the convex shape (denoted by reference numeral 824) shown in FIG. 13b, whereas if the clearance gap 814 increased too slowly, the pressure transition profile would normally have the concave shape (denoted by reference numeral 826). However, as will now be explained, with the present invention, the height of the clearance gap 814 automatically adjusts to obtain the linear pressure transition profile (denoted by reference numeral 828).

Since the compartment 818 communicates with the pressurization/reflux return compartment adjacent the second end 806b through a passage 820 positioned equidistantly between the first and second ends 806a, 806b, the compartment 818 of each sealing element 802 will be maintained at a pressure level which is equal to the pressure of the sealing face 808 at the equidistant position. If the clearance gap 814 increases too rapidly, the pressure (as shown by reference numeral 830) in the compartment 818 will be greater than the average(denoted by reference numeral 831) of the pressure of the pressurization compartment 52 and the pressure of the pressurization compartment 54. Since the pressure exerted against the sealing face 808 between the first end 806a and the position of the passage 820 will be significantly less than the pressure 830, and the pressure exerted against the sealing face 808 between the second end 806a and the position of the passage 820 will only be slightly greater than the pressure 830, a moment will be developed about the first end 806a tending to force the clearance gap 814 to narrow. The narrowing of the clearance gap 814 will cause a flattening of the pressure transition profile. The clearance gap 814 (and the angle between the sealing face 808 and the rotor face) will continue to narrow in response to the pressure differential between the compartment 818 and the apertures 34, 35 until the pressure 830 equals the average of the pressure of the pressurization compartment 52 and the pressurization compartment 54, at which point a linear pressure transition profile will be obtained.

Conversely, if the clearance gap 814 increased too slowly, the pressure (as shown by reference numeral 832) in the compartment 818 will be less than the average of the pressure of the pressurization compartment 52 and the pressurization compartment 54. Since the pressure exerted against the sealing face 808 between the second end 806a and the position of the passage 820 will be significantly greater than the pressure 832, and the pressure exerted against the sealing face 808 between the first end 806a and the position of the passage 820 will only be slightly less than the pressure 832, a moment will be developed about the first end 806a tending to force the clearance gap 814 to widen The widening of the clearance gap 814 will cause a flattening of the pressure transition profile. The clearance gap 814 (and the angle between the sealing face 808 and the rotor face) will continue to widen in response to the pressure differential between the compartment 818 and the apertures 34, 35 until the pressure 832 equals the average of the pressure of the pressurization compartment 52 and the pressurization compartment 54, at which point a linear pressure transition profile will be obtained.

Numerous variations of the foregoing clearance seal will be apparent. In one such variation, shown in FIG. 13a, the sealing face 808 includes a plurality of passages, provided as a labyrinth, for increasing the flow resistance for a given channel gap 814 height. In another variation (not shown), rather than the sealing face 808 being planar, the sealing face 808 includes a plurality of planar stepped portions, so that the sealing face 808 tapers away from the rotor face over a plurality of steps and the flow resistance is increased for a given angle of deflection of the sealing element 802. In yet another variation, the aperture 820 is positioned at an off-centre position so as to provide a controlled non-linear pressure transition profile.

Figure 14:
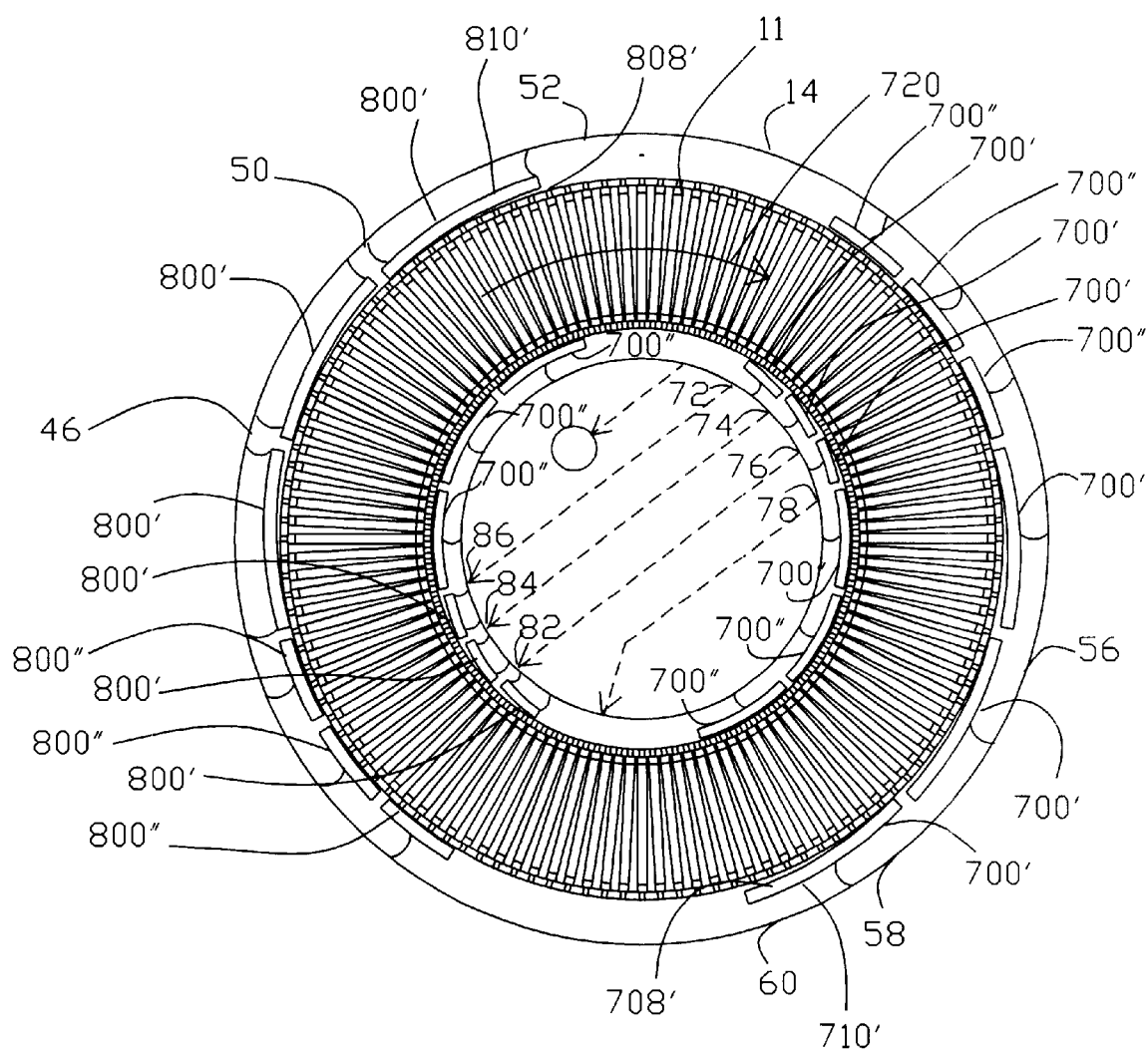
FIG. 14 is a sectional view of a radial-flow-configured rotary PSA module, such as the PSA module shown in FIG. 8, depicting the placement of the self-regulating clearance seals employed therein.

In still another variation, the clearance seals 800 are used to provide sealing for closed sectors, such as the closed axial flow sectors 675, 676 shown in FIG. 10. In this latter variation, the bearings 812 are replaced with fasteners which rigidly secure the first end 806a of the sealing element 802 to a race on the stattor valve face 40 (or stator valve face 41) so as to prevent variations in the height of the clearance gap 814. Further, the first and second compartments 818 do not communicate with any blowdown compartments, but are pressurized to the pressure of the apertures 34, 35. As a result, the sealing faces 808 are urged towards the rotor face so as to limit the gas flow through the apertures 34, 35.
FIG. 14

FIG. 14 shows self-regulating clearance seals 700', 800' respectively for use with the blowdown and pressurization compartments of a radial-flow configured rotary PSA module. The blowdown clearance seals 700' are shown positioned between the stator and rotor valve faces for use with the countercurrent blowdown compartments 56, 58, 60 and the cocurrent blowdown compartments 72, 74, 76, 78. Similarly, the pressurization clearance seals 800' are shown positioned between the stator and rotor valve faces for use with the pressurization compartments 46, 50, 52, and the light reflux return compartments 82, 84, 86. In addition, FIG. 14 shows self-regulating blowdown clearance seals 700", identical to clearance seals 700', but being used without blowdown compartments for sealing closed radial flow sectors, similar to the closed axial flow sectors 675, 676 shown in FIG. 10. Alternately, pressurization seals 800", identical to clearance seals 700", may be used without pressurization compartments for sealing closed radial flow sectors.

Figure 15:
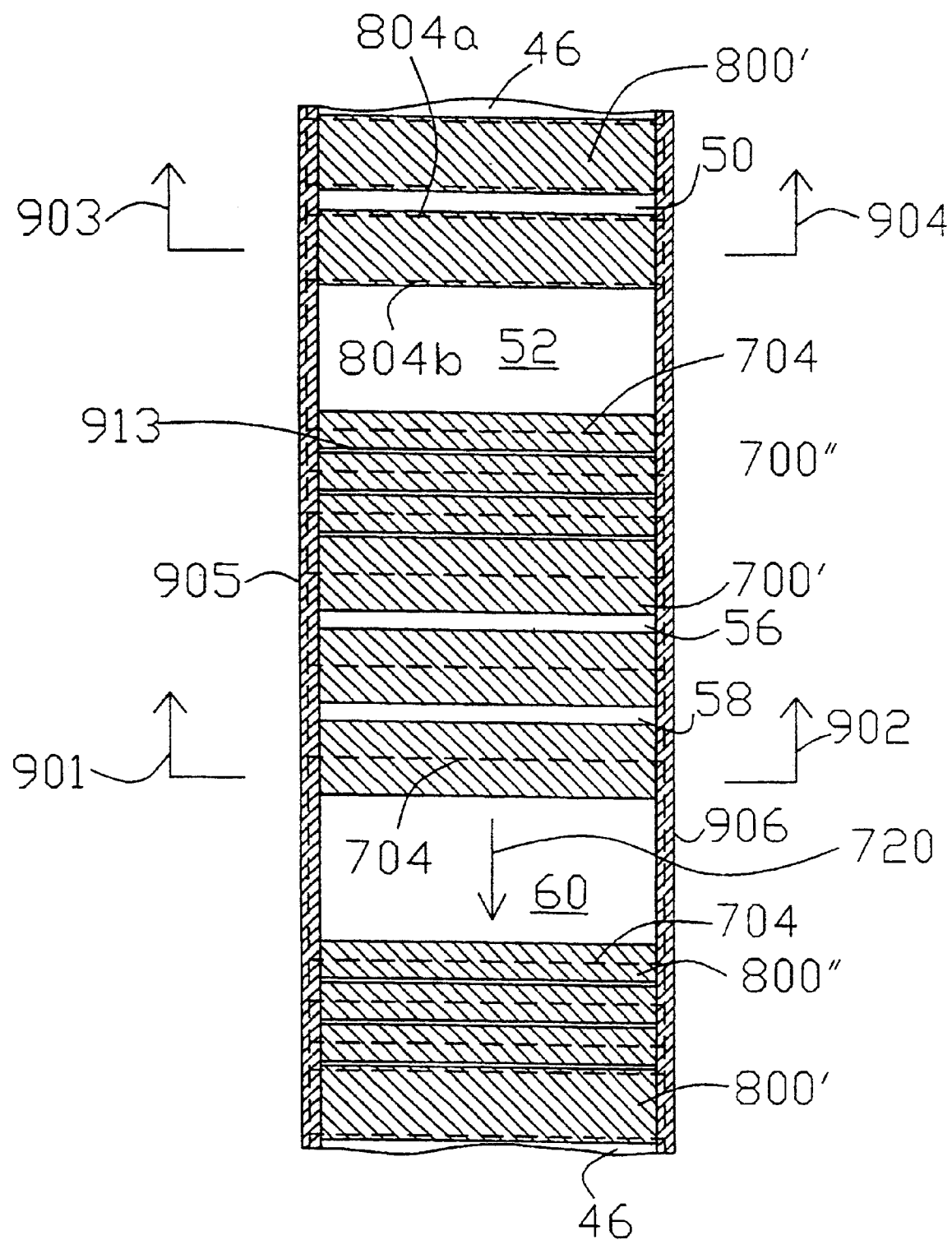
FIG. 15 is an unrolled view of the outer seal assembly from FIG. 14.
Figure 16A:
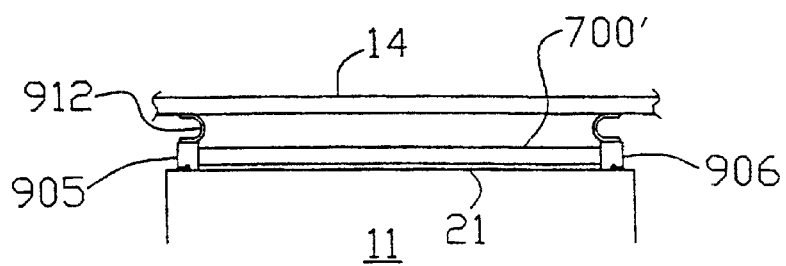
FIGS. 16A and 16B are sectional views of the seal assembly shown in FIG. 15.
Figure 16B:
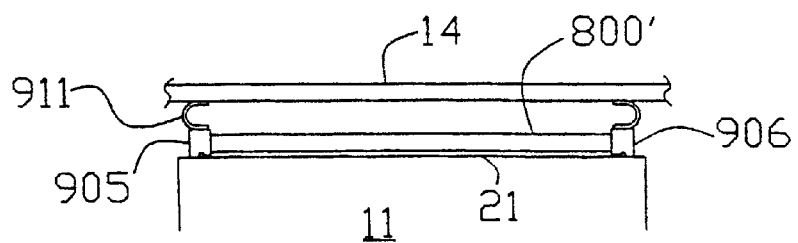

The clearance seals 700', 800' are respectively substantially identical to the clearance seals 700, 800. Unlike the clearance seals 700, 800, however, the clearance seals 700', 800' respectively have arcuate sealing faces 708', 808' and arcuate opposed faces 710', 810' instead of the substantially planar sealing faces 708, 808 and the substantially planar opposed faces 710, 810 to allow the clearance seals 700', 800' to regulate the flow of radial gas flow through the rotary PSA module. However, as discussed above with respect to the clearance seals 700, 800, the clearance seals 700', 800' are not limited for use with rotary PSA modules. Rather, the clearance seals 700' may be used to regulate the pressure letdown of radial flow of gas between any first gas flow conduit and any second gas flow conduit moving past the first gas flow conduit. Similarly, the clearance seals 800' may be used to regulate the pressurization, from a first gas flow conduit, of a second gas conduit which moves past the first gas flow conduit.
FIGS. 15, 16A and 16B FIG. 15 is an unrolled view of the first valve face seals from FIG. 14, with the view split arbitrarily at feed pressurization compartment 46. FIGS. 16A and 16B are sections 901–902 and 903–904 respectively of FIG. 15.

Circumferential seals 905 and 906 provide sealing between the stator 14 and rotor 11 at the ends thereof, to bound the first sealing face 21 at each end while closing the function compartments (as well as pressure balancing compartments that have no intended through flow function) between each adjacent pair of clearance seals 700', 700", 800' and 800". Seals 905 and 906 are attached to stator 14 in order to maintain the seals in position while reacting frictional torques. Seals 905 and 906 may be solid or split rings. In the case of split ring circumferential seals, the split should be at a point of the circumference where the working pressure most closely approaches external ambient pressure, and may be an anchor point for tensile or pin connections to the casing. Hinges 712 and 812 of respectively the blowdown and pressurization clearance seals are attached to the circumferential seals which thus hold the clearance seals in place. The clearance seals through their hinge connections may also desirably serve as struts to control the relative spacing of the circumferential seals to resist lateral deflections under pressure loading. Flexible static seals 911 and 912 are provided with the appropriate curvature to flex in tension for the portions of the circumferential seals respectively sealing compartments at positive working pressure and vacuum (if any). Static seals 911 and 912 may be substantially identical in section and material of construction to the biasing elements 704, 804*a* and 804*b* of the clearance seals. The section and material should provide adequate compliance to absorb deflections due to manufacturing tolerances, initial misalignment, pressure and thermal loads, and wear of the seal surfaces. As shown by the dashed lines on FIG. 15, static seals 911 and 912 and biasing elements 704, 804*a* and 804*b* are jointed at the corners of the function compartments (and supplementary pressure balancing compartments 913) to maintain static sealing of those compartments behind the clearance and circumferential seals.

Suitable materials for static seals and biasing elements may be elastomers, thermoplastics or thin metal foil according to working temperatures and compatibility with process gas components. Suitable materials for the rubbing circumferential seals include PTFE composites for operation near ambient temperature. A refinement for reduced frictional loads and longer service life is to include pressure balancing grooves extending circumferentially in segments over limited angular arcs at a central point of the rubbing surface of the circumferential seals. The angular arc of each segment will correspond to an angular sector (e.g. adjacent a function compartment) of the seal which is sealing a substantially constant working pressure over that angular arc. At one or a few locations for each such segment, a vent passage is provided between the groove and the higher pressure side of the seal. The vent passage is sized so that the normal design leakage flow across the seal in that angular arc would only cause a small pressure drop between the higher pressure side of the seal and the groove if substantially all that design leakage flow were flowing through the vent passage. Hence, the portion of the seal upstream of the groove (e.g. the higher pressure side of the seal) will be nearly pressure balanced and hence under low frictional loading as long as leakage across the seal in this sector remains within the design flow. In normal operation, the sealing load will thus be carried primarily on the downstream side of the circumferential seals. If the seal is damaged or wears severely so that leakage on the downstream side increases, increased flow through the vent passage will result in greater pressure drop in the pressure balancing groove, so that the entire width of the seal will be more heavily loaded to reduce overall leakage albeit with greater frictional loading during extended service life until the seals is replaced.

Figure 17:
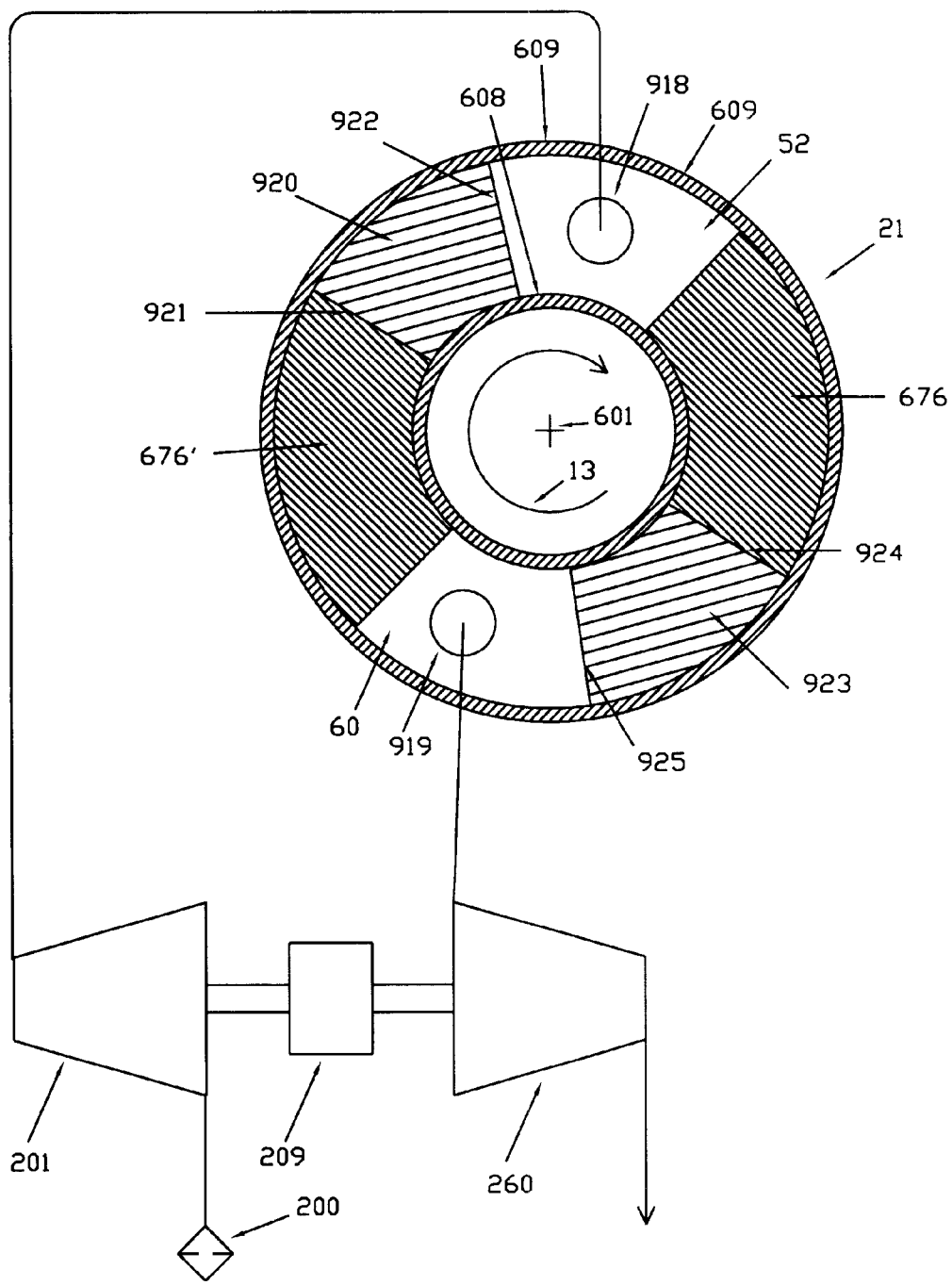
FIG. 17 shows the first valve face of a simplified axial-flow-configured rotary vacuum PSA module as shown in FIG. 9.
Figure 18:
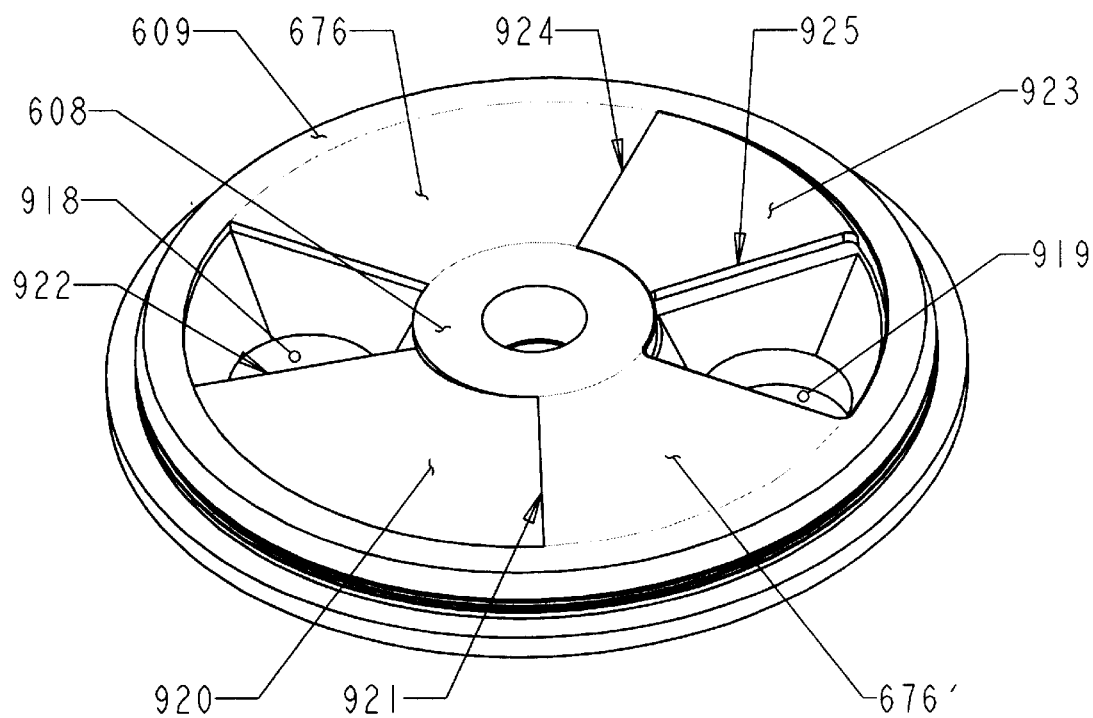
FIG. 18 shows a perspective view of the first valve face of FIG. 17.
Figure 22:
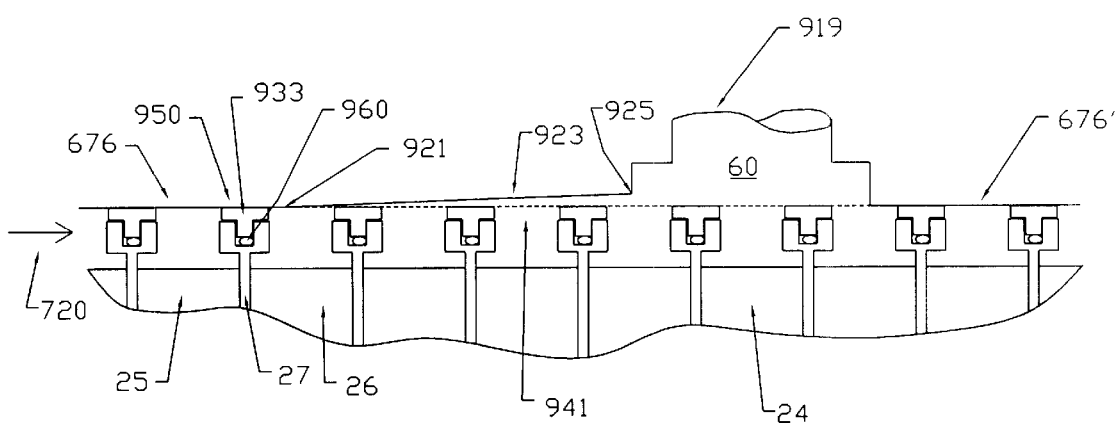
FIG. 22 is a sectional view of a circumferential section of the module of FIG. 17
Figure 23:
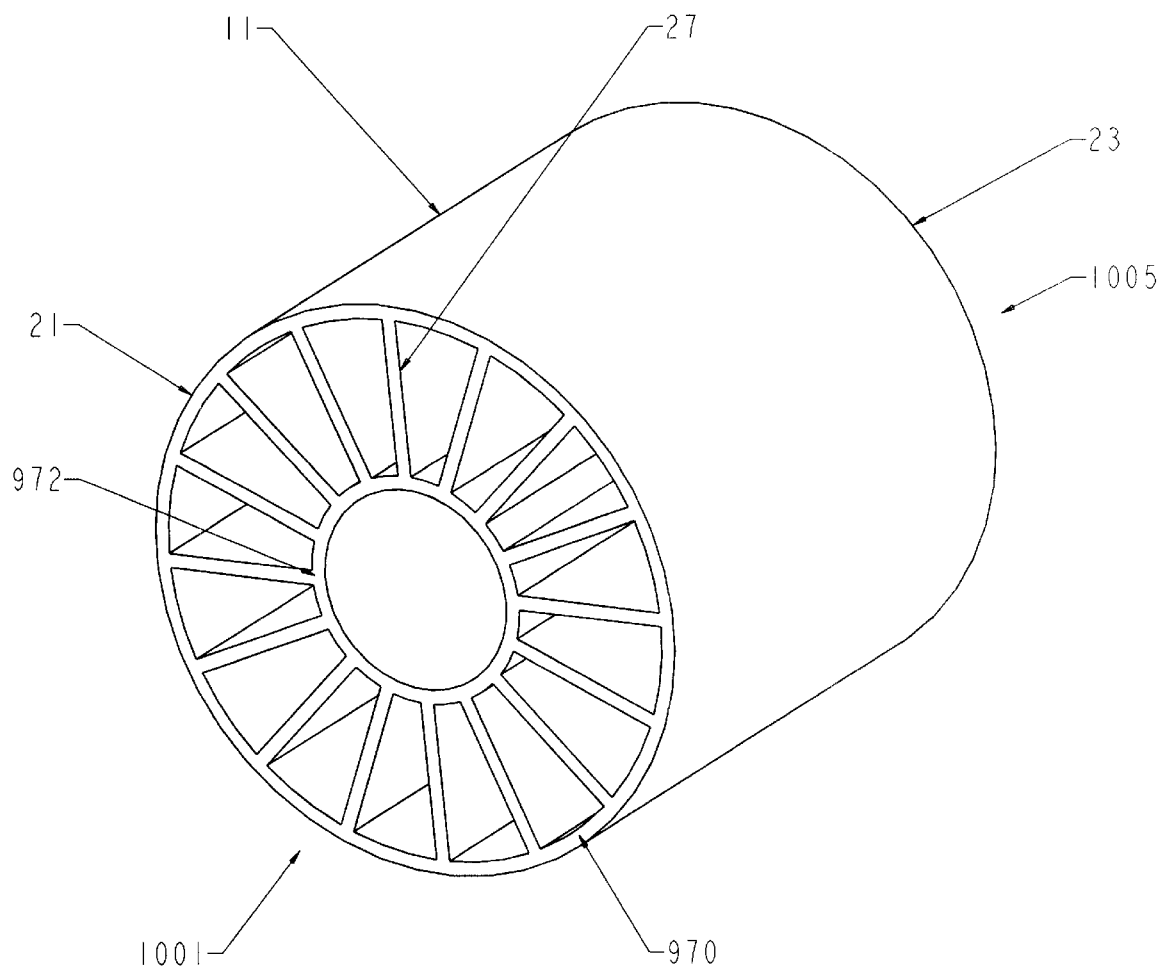
FIG. 23 shows a sketch of a rotor of the module in FIG. 17.

FIGS. 17, 18 and 22

FIG. 17 shows the stator valve face 41 of a simplified axial-flow-configured rotary vacuum 25 PSA module as shown in FIG. 9. FIG. 18 shows a perspective view of the first valve face of FIG. 17 to better indicate the narrow gap flow control feature. In FIG. 17, a single stage feed blower 201 delivers compressed air to feed port 918 in compartment 52, while a single stage vacuum pump withdraws nitrogen enriched exhaust gas from exhaust port 919 in compartment 60.

The stator valve face 41 of FIGS. 17 and 18 has a first closed sector 676 corresponding to the light reflux exit steps, and a second closed sector 676' corresponding to the light reflux return steps, of the vacuum PSA cycle. In sectors 676 and 676', fluid flow in the valve face is minimized by maintaining a narrow sealing gap between rotor and stator faces of no more than about 50 microns and preferably between 0 and about 25 microns.

The stator valve face 41 of FIGS. 17 and 18 also has a feed pressurization sector 920 extending from angular position 921 adjoining closed sector 676' to angular position 922 opening into compartment 52. A flow control clearance gap between and substantially across the rotor and stator faces is established between angular positions 921 and 922, opening from 0–50 microns at position 921 to about 50–500 microns at position 922 so as to provide flow restriction to control the rate of pressurization of adsorbers progressing from angular positions 921 to 922. A self-regulating clearance seal as shown in FIG. 13*a* may be used in pressurization sector 920, or alternatively the clearance gap may have a fixed geometry.

The stator valve face 41 of FIGS. 17 and 18 also has a countercurrent blowdown sector 923 extending from angular position 924 adjoining closed sector 676 to angular position 925 opening into compartment 60. A flow control clearance gap between the rotor and stator faces is established between angular positions 924 and 925 and substantially across the rotor and stator faces, opening from 0–50 microns at position 924 to about 50–500 microns at position 925 so as to provide flow restriction to control the rate of depressurization of adsorbers progressing from angular positions 924 to 925. A self-regulating clearance seal as shown in FIG. 12*a* may be used in countercurrent blowdown sector 923, or alternatively the clearance gap may have a fixed geometry.

Figure 19:
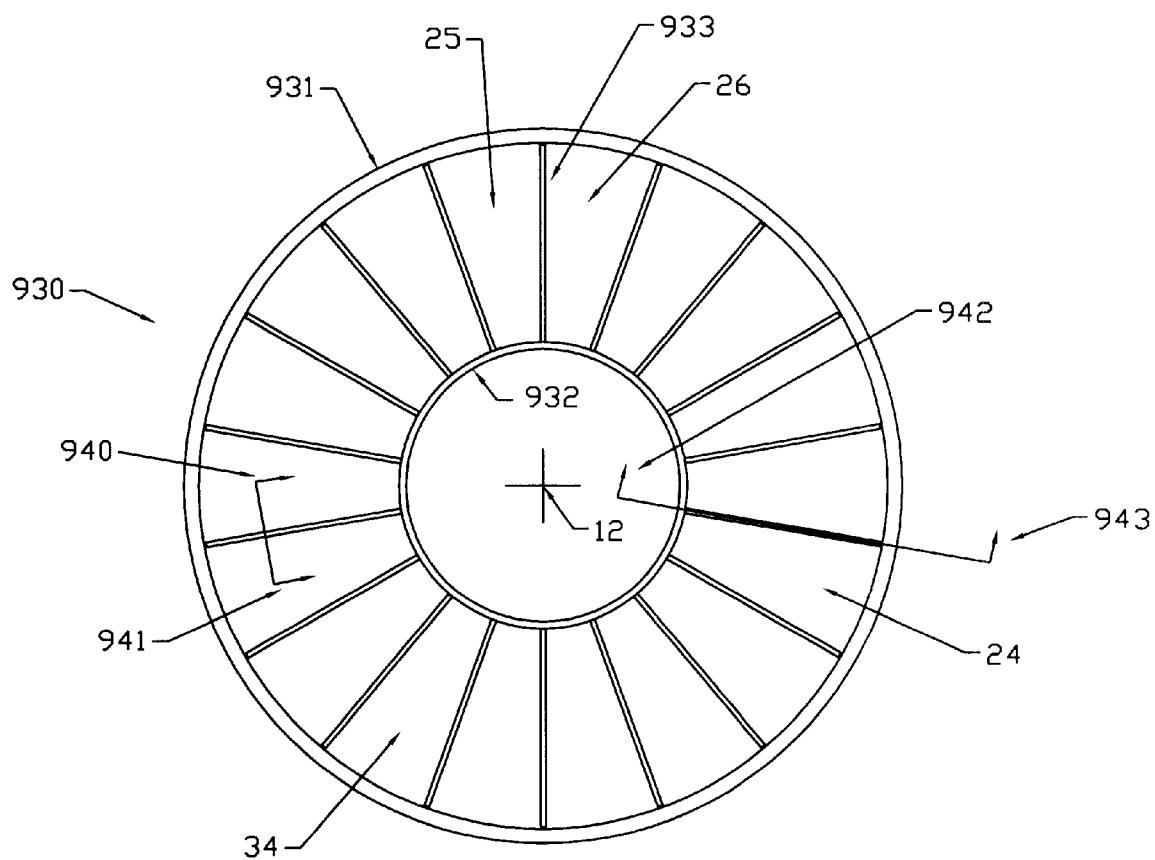
FIG. 19 shows a unitized seal for a rotor to engage with the valve face of FIG. 17, FIG. 20 and FIG. 21 are sections of the seal of FIG. 19 as installed in the rotor of FIG. 9.
Figure 20:
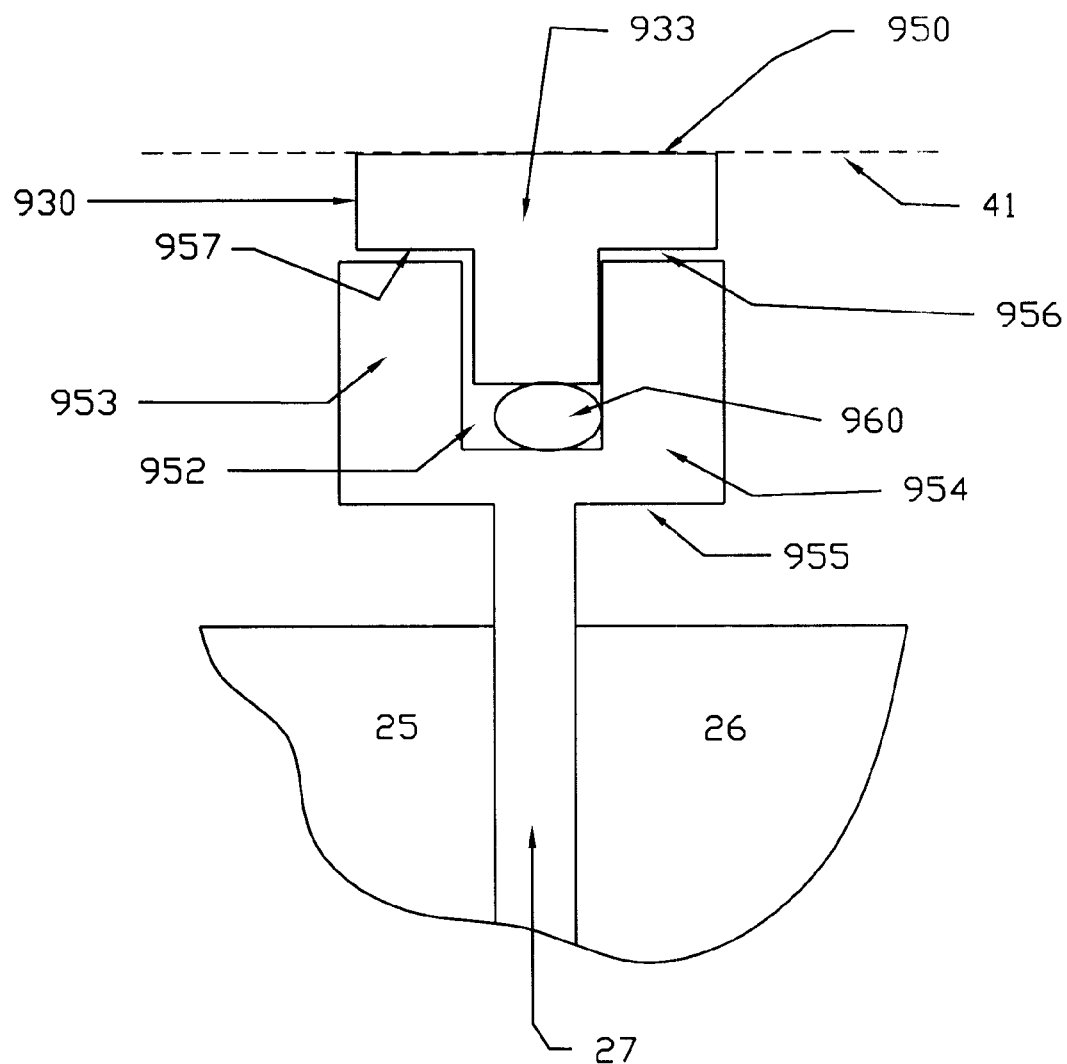
Figure 21:
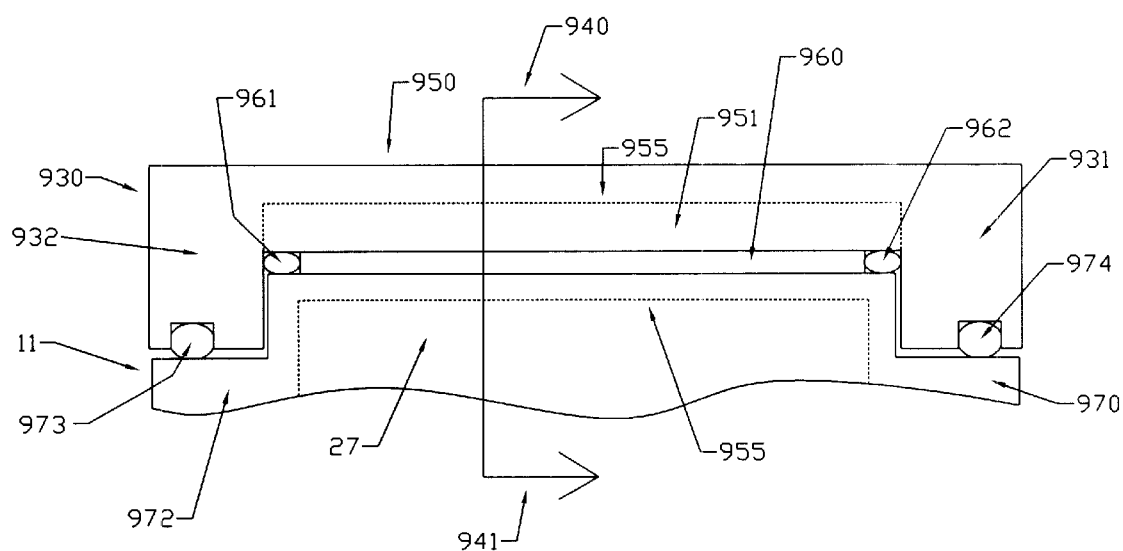

FIG. 22 shows a sectional view of a circumferential section of the module of FIG. 17, using the sealing member 930 illustrated in FIGS. 19, 20 and 21. As is clearly evident, the clearance gap defined by the space between the opposing rotor and stator valve faces 21 and 41 widens towards the compartment being opened (such as heavy product compartment 60, which is illustrated), to effectively obtain progressive opening of an orifice (i.e. a throttling effect) to dampen the rate of pressure decrease as countercurrent blowdown takes place in sector 923 and gas exits through compartment 60. The same effect can be obtained for purposes of pressurization of the absorbers.

FIGS. 19, 20 and 21

FIGS. 19 and 20 show a unitized sealing member or rotor seal 930 for sealing engagement with the stator valve face 41 and rotor valve face 21 of the axial flow rotary pressure swing adsorption apparatus of FIG. 17, with "N" adsorbent beds or adsorbers 24. In the specific embodiment illustrated, N=16. The sealing member 930 is disposed between the rotor valve face 21 and the stator valve face 41 to maintain sealing engagement with the rotor valve face 21 and the stator valve face 41. Manufacturing tolerances, misalignment, differential thermal expansion, and operational wear present challenges for maintaining proper sealing between the rotor and stator of a rotary pressure swing adsorption apparatus. In order to maintain sealing engagement with the rotor valve face 21 and the stator valve face 41 despite these imperfections, sealing member 930 is configured for transverse movement relative to the valve faces 21 and 23.

The rotor seal includes an outer circumferential seal ring 931, an inner circumferential seal ring 933, and a set of "N" laterally extending seal elements or spokes 933 angularly separating adjacent pairs of the "N" adsorbers, e.g. adsorbers 25 and 26. The seal spokes 933 extend laterally between outer seal ring 931 and inner seal ring 932. In one embodiment, the seal spokes extend radially between outer seal ring 931 and inner seal ring 932.

In one embodiment, the seal spokes 933 are rigidly attached to rings 931 and 932. In another embodiment, the spokes may be separate components engaged by notches into rings 931 and 932. In either case, the rotor seal 930 is of unitary construction whereby spokes 933 join rings 931 and 932.

The materials for rotor seal 930 and stator valve face 41 are selected for compatibility in rubbing contact to achieve low friction and low wear. Seal 930 may be fabricated from (or faced with) a PTFE compound, while face 41 may be fabricated from or coated with a metal alloy or ceramic of high hardness and with a smooth surface finish.

FIG. 20 and FIG. 21 are sections of the seal of FIG. 19 as installed in the rotor of FIG. 9. FIG. 20 is the section of a spoke indicated by arrows 940 and 941 in FIGS. 19 and 21, while FIG. 21 is a radial section indicated by arrows 942 and 943 in FIG. 19.

Referring to FIG. 20, rotor seal 930 is aligned for engagement to faces presented by each of partition 27, inner wall 970, and outer wall 972 of rotor 11. Partitions 27 extend radially (laterally) between inner wall 970 and outer wall 972, and join inner wall 970 to outer wall 972, to thereby define a plurality of flow paths extending between first and second rotor ends 1001, 1005.

Referring to FIG. 20, spoke 933 is aligned with and engaged to partition 27, and has a sealing face 950 which engages stator valve face 41. The spoke 933 has a static sealing web 951 disposed in a groove 952. Groove 952 is defined by flanges 953 and 954 extending from shoulder 955 of partition 27 between typical adsorbers 25 and 26, portions of which are shown in FIG. 20. Spoke 933 has shoulders 956 and 957 to achieve a desired angular sealing width. During operation, spoke 933 is retained within groove 952 and is disposed in sealing engagement with partition 27 (flange 954) by frictional drag caused by seal 930 moving against stator valve surface 41. Alternatively, such sealing engagement is maintained by pressure differentials between flow-paths. Simultaneously, spoke 933 is permitted to move transversely (in this case axially) relative to valve surfaces 21 and 41 to ensure sealing engagement is maintained with stator valve surface 41.

A preloading element or resilient member 960 is desirably provided or captured in groove 952 to energize or bias (or urge) spoke 933 against stator face 41. In one embodiment, resilient member 960 is keyed into groove 952. Preloading element 960 is more resilient or compliant than spoke 933. In one embodiment, preloading element 960 is characterized by a lower elastic modulus than sealing member 930. In this respect, preloading element 960 may be an elastomeric seal (e.g. an O-ring as shown) which also provides static sealing to minimize leakage past steps 956 and 957 between adsorbers 25 and 26. Alternatively, preloading element 960 may be a metallic spring (e.g. a wave spring, or an elliptical coil spring).

FIG. 21 shows the typical spoke 933 attached to rings 931 and 932. Static seals 961 and 962 cooperate with preloading element 960 to enable some axial movement between the seal 930 and rotor 11, to accommodate manufacturing tolerances, misalignment, differential thermal expansion, and wear of the seal 930 or the stator valve face 41. Outer ring 931 engages the outer wall 970 of rotor 11 with a compliant static seal 971, and inner ring 932 engages the inner wall 972 of rotor 11 with a compliant static seal 973. Static seals 971 and 973 are more resilient, and characterized by higher elastic modulus than rings 931 and 932. An outer annular gap between static seals 971 and 962, and similarly an inner annular gap between static seals 973 and 961, may be pressurized e.g. with compressed feed air so as to energize seal 930 against first valve face 41.

It will be appreciated that a similar seal arrangement to that shown for the first valve faces 21 and 41 at first rotor end 1001 in FIGS. 17–21 may be provided for the second valve faces 23 and 43 at second rotor end 1005.

The foregoing description of the preferred embodiments of the invention is intended to be illustrative of the present invention. Those of ordinary skill will be envisage certain additions, deletions or modifications to the described embodiments without departing from the spirit or scope of the invention as defined by the appended claims.

We claim:

1. A clearance valve seal for interposition between a pair of relatively moveable valve faces for controlling a gas flow through a first gas conduit opening into a first of the valve faces, the clearance seal comprising:

a sealing element for interposition between the first valve face and a second of the valve faces, the sealing element including a sealing face for disposition adjacent the first valve face, and an opposing face for disposition adjacent the second valve face, the sealing face tapering away from the first valve face along a length of the sealing element, and the opposing face and the second valve face together defining a passage therebetween for biasing the sealing face towards the first valve face in response to a pressure differential between the passage and the first gas conduit.

2. The clearance valve seal according to claim 1, wherein the valve seal includes biasing means coupled to the sealing element for biasing the sealing face towards the first valve face.

3. The clearance valve seal according to claim 2, wherein the biasing means is coupled to the opposing face, and the passage is defined by the opposing face, the second valve face and the biasing means.

4. The clearance valve seal according to claim 3, wherein the sealing element includes a pair of opposite ends, and the biasing means comprises a biasing element positioned equidistantly between the opposite ends and extending between the second valve face and the opposing face.

5. The clearance valve seal according to claim 3, wherein the sealing element includes a pair of opposite ends, and the biasing means comprises a pair of biasing elements positioned adjacent the opposite ends and extending between the second valve face and the opposing face.

6. The clearance valve seal according to claim 5, wherein the sealing means comprises a slipper including an aperture positioned equidistantly between the opposite ends and extending through the slipper between the sealing face and the opposing face.

7. The clearance valve seal according to claim 1, wherein the sealing element includes coupling means for coupling the sealing element adjacent an end thereof to one of the first and second valve faces.

8. The clearance valve seal according to claim 7, wherein the coupling means couples the sealing element adjacent the end to the first valve face.

9. The clearance valve seal according to claim 7, wherein the coupling means rigidly couples the sealing element adjacent the end to the one valve face.

10. The clearance valve seal according to claim 7, wherein the coupling means pivotally couples the sealing element adjacent the end to the one valve face.

11. The clearance valve seal according to claim 7, wherein the second valve face includes a second gas conduit communicating with the passage for varying a distance between the sealing face and the first valve face in response to a pressure differential between the passage and the first gas conduit.

12. The valve seal according to claim 11, wherein the passage is positioned for providing a smooth pressure transition profile between a pressure of the first gas conduit and a pressure of the second gas conduit.

13. A self-regulating clearance valve seal for regulating a rate of gas flow between a first gas conduit opening into a first valve face, and a second gas conduit opening into a second valve face movable with respect to the first valve face, the clearance seal comprising:
- a sealing element for interposition between the first valve face and the second valve face, the sealing element including a sealing face for disposition adjacent the second valve face, and an opposing face for disposition adjacent the first valve face, the opposing face and the first valve face together defining a passage therebetween communicating with the first gas conduit for varying the clearance distance in response to a pressure differential between the passage and the second gas conduit; and
- resilient biasing means coupled to the sealing element for biasing the sealing face towards the second valve face.

14. The valve seal according to claim 13, wherein the passage is positioned for providing a smooth pressure transition profile between a pressure of the first gas conduit and a pressure of the second gas conduit.

15. The valve seal according to claim 14, wherein the pressure transition profile comprises a linear pressure transition profile.

16. The valve seal according to claim 13, wherein the sealing element comprises an elongate slipper including a pair of opposite ends, the sealing face and the opposing face extending between the opposite ends, and the slipper is pivotally coupled adjacent one of the opposite ends to the second valve surface.

17. The valve seal according to claim 16, wherein the first gas conduit is positioned adjacent the other of the opposite ends, and the sealing face tapers away from the second valve face from the one opposite end towards the other opposite end.

18. The valve seal according to claim 17, wherein the sealing face tapers away from the second valve face over a plurality of steps.

19. The valve seal according to claim 16, wherein the biasing means comprises a biasing element positioned equidistantly between the opposite ends and extending between the first valve face and the opposing face, and the passage comprises a compartment defined by the first valve face, the opposing face and the biasing element.

20. The valve seal according to claim 16, wherein the biasing means comprises a pair of biasing elements positioned adjacent the opposite ends and extending between the first valve face and the opposing face, and the passage comprises a compartment defined by the first valve face, the opposing face and the biasing elements.

21. The valve seal according to claim 20, wherein the slipper includes an aperture positioned equidistantly between the opposite ends and extending through the slipper between the sealing face and the opposing face.

22. The valve seal according to claim 16, wherein the first gas conduit comprises a plurality of apertures opening into the first valve face for receiving gas at a plurality of different pressure levels, the elongate slipper is positioned between adjacent ones of the apertures, and the passage is positioned for providing a linear pressure transition profile between a pressure of one of the adjacent apertures and the other of the adjacent apertures.

23. The valve seal according to claim 22, wherein the biasing means comprises a biasing element positioned equidistantly between the opposite ends and extending between the first valve face and the opposing face, the passage comprises a first compartment defined by the first valve face, the biasing element and a portion of the opposing face extending between the biasing element and the one opposite end, and a second compartment defined by the first valve face, the biasing element and a portion of the opposing face extending between the biasing element and the other opposite end, the first compartment communicates with the one adjacent aperture, and the second compartment communicates with the other adjacent aperture.

24. The valve seal according to claim 13, wherein the sealing face includes a plurality of passageways formed therein for reducing the gas flow rate along the sealing face.

25. A rotary valve comprising:
- a stationary valve element including a first valve face and a first gas conduit opening into the first valve face;
- a rotary valve element rotatable relative to the stationary valve element, the rotary valve element being in fluid communication with the stationary valve element and including a second valve face and a second gas conduit opening into the second valve face; and
- a valve seal interposed between the first and second valve face, the valve seal including a sealing face disposed adjacent the second valve face, and an opposing face disposed adjacent the first valve face, the opposing face and the first valve face together defining a passage therebetween for biasing the sealing face towards the second valve face in response to a pressure differential between the passage and the second gas conduit.

26. The rotary valve according to claim 25, wherein the valve seal includes a pair of opposite ends, and the rotary valve includes coupling means for coupling the valve seal adjacent one of the opposite ends to one of the first and second valve faces.

27. The rotary valve according to claim 26, wherein the coupling means couples the valve seal adjacent the one end to the second valve face.

28. The rotary valve according to claim 26, wherein the coupling means rigidly couples the valve seal adjacent the one end to the one valve face.

29. The rotary valve according to claim 26, wherein the coupling means pivotally couples the valve seal adjacent the one end to the one valve face.

30. The rotary valve according to claim 29, wherein the first gas conduit communicates with the passage for varying a clearance distance between the sealing face and the second valve face in response to a pressure differential between the passage and the second gas conduit.

31. The rotary valve according to claim 30, wherein the passage is positioned for providing a smooth pressure transition profile between a pressure of the first gas conduit and a pressure of the second gas conduit.

32. The rotary valve according to claim 31, wherein the pressure transition profile comprises a linear transition profile.

33. The rotary valve according to claim 30, wherein the first gas conduit is positioned adjacent the other of the opposite ends, and the sealing face tapers away from the second valve face from the one opposite end towards the other opposite end.

34. The rotary valve according to claim 33, wherein the sealing face tapers away from the second valve face over a plurality of steps.

35. The rotary valve according to claim 26, wherein the valve seal includes a biasing element positioned equidistantly between the opposite ends and extending between the first valve face and the opposing face, and the passage comprises a compartment defined by the first valve face, the opposing face and the biasing element.

36. The rotary valve according to claim 26, wherein the valve seal includes a pair of biasing elements positioned adjacent the opposite ends and extending between the first valve face and the opposing face, and the passage comprises a compartment defined by the first valve face, the opposing face and the biasing elements.

37. The rotary valve according to claim 36, wherein the valve seal includes an aperture positioned equidistantly between the opposite ends and extending through the valve seal between the sealing face and the opposing face.

38. The rotary valve according to claim 26, wherein the first gas conduit comprises a plurality of apertures opening into the first valve face for receiving gas at a plurality of different pressure levels, the valve seal is positioned between adjacent ones of the apertures, and the passage is positioned for providing a linear pressure transition profile between a pressure of one of the adjacent apertures and the other of the adjacent apertures.

39. The rotary valve according to claim 38, wherein the valve seal includes a biasing element positioned equidistantly between the opposite ends and extending between the first valve face and the opposing face, the passage comprises a first compartment defined by the first valve face, the biasing element and a portion of the opposing face extending between the biasing element and the one opposite end, and a second compartment defined by the first valve face, the biasing element and a portion of the opposing face extending between the biasing element and the other opposite end, the first compartment communicates with the one adjacent aperture, and the second compartment communicates with the other adjacent aperture.

40. The rotary valve according to claim 25, wherein the sealing face includes a plurality of passageways formed therein for reducing the gas flow rate across the sealing face.

41. A rotary valve comprising:
a stationary valve element including a first valve face and a plurality of first apertures opening into the first valve face;
a rotary valve element rotatably coupled to the stationary valve element, the rotary valve element being in fluid communication with the stationary valve element and including a second valve face and a second aperture opening into the second valve face; and
a plurality of sealing elements interposed between the first and second valve face for regulating a rate of gas flow through the first and second apertures, each said sealing element including a sealing face disposed adjacent the second valve face and being pivotable relative thereto for varying a gas flow rate through the second aperture in accordance with a clearance distance between the sealing face and the second valve face, and an opposing face disposed adjacent the first valve face, the opposing face and the first valve face together defining a passage therebetween communicating with one of the first apertures for varying the clearance distance in response to a pressure differential between the passage and the second gas conduit.

42. The rotary valve according to claim 41, wherein each said sealing element is positioned between adjacent ones of the first apertures, and each said respective passage is positioned for providing a smooth pressure transition profile between a pressure of one of the adjacent apertures and a pressure of the other of the adjacent apertures.

43. The rotary valve according to claim 41, wherein each said sealing element is positioned between adjacent ones of the first apertures and comprises an elongate slipper including a pair of opposite ends, each said sealing face and respective opposing face extending between the respective opposite ends, and each said slipper is pivotally coupled adjacent one of the respective opposite ends to the first valve face.

44. The rotary valve according to claim 43, wherein each said slipper includes a biasing element positioned equidistantly between each said respective opposite ends and extending between the first valve face and the respective opposing face, and each said passage comprises a compartment defined by the first valve face, the opposing faces of adjacent ones of the sealing elements, and adjacent ones of the biasing elements.

45. The rotary valve according to claim 43, wherein each said slipper includes a pair of biasing elements positioned adjacent the respective opposite ends and extending between the first valve face and the respective opposing face, and each said passage comprises a compartment defined by the first valve face, the opposing faces of adjacent ones of the sealing elements, and the respective biasing elements.

46. The rotary valve according to claim 45, wherein each said slipper includes an aperture positioned equidistantly between the opposite ends and extending through the slipper between the respective sealing face and the respective opposing face.

47. A rotary module for implementing a pressure swing adsorption process having an operating pressure cycling between an upper pressure and a lower pressure for extracting a first gas fraction and a second gas fraction from a gas mixture including the first and second fractions, the rotary module comprising:
a stator including a first stator valve surface, a second stator valve surface, a plurality of first function compartments opening into the first stator valve surface, and a plurality of second function compartments opening into the second stator valve surface;
a rotor rotatably coupled to the stator and including a first rotor valve surface in communication with the first stator valve surface, a second rotor valve surface in communication with the second stator valve surface, a plurality of flow paths for receiving adsorbent material therein, each said flow path including a pair of opposite flow path ends, and a plurality of apertures provided in the rotor valve surfaces and in communication with the flow path ends and the function compartments for cyclically exposing each said flow path to a plurality of discrete pressure levels between the upper and lower pressures; and
a plurality of sealing elements interposed between the first rotor valve surface and the first stator valve surface and between the second rotor valve surface and the second stator valve surface, each said sealing element including a sealing face disposed adjacent a respective one of the rotor valve surfaces and tapering away therefrom for regulating a rate of gas flow through the first and second function compartments.

48. The rotary module according to claim 47, wherein each said sealing element is pivotable relative to the respective one rotor valve surface for varying the gas flow rate in accordance with a clearance distance between the sealing face and the one rotor valve surface.

49. The rotary module according to claim 48, wherein each said sealing element includes an opposing face opposite the sealing face and being disposed adjacent the respective stator valve face, the opposing face and the respective stator valve face together defining a passage therebetween communicating with one of the function compartments for varying the clearance distance in response to a pressure differential between the passage and an adjacent flow path end.

50. A rotary pressure swing adsorption apparatus for implementing a pressure swing adsorption process having an operating pressure cycling between an upper pressure and a lower pressure for extracting a first gas fraction and a second gas fraction from a mixture including the first and second gas fractions, the apparatus comprising:
   a stator including a first stator valve surface, a second stator valve surface, a plurality of first function compartments opening into the first stator valve surface, and a plurality of second function compartments opening into the second stator valve surface;
   a rotor rotatably coupled to the stator for rotation about an axis, including a first rotor valve surface in communication with the first stator valve surface, a second rotor valve surface in communication with the second stator valve surface, a plurality of flow paths including adsorbent material disposed therein, each said flow path including a pair of opposite flow path ends, and a plurality of apertures provided in the rotor valve surfaces and in communication with the flow path ends and the function compartments for cyclically exposing each said flow path to a plurality of pressure levels between the upper and lower pressures; and
   a first sealing member disposed between at least one of (i) the first rotor valve surface and the first stator valve surface, and (ii) the second rotor valve surface and the second stator valve surface, and configured for transverse movement relative to the corresponding valve surfaces.

51. The rotary pressure swing adsorption apparatus as claimed in claim 50, wherein the sealing member is configured to maintain sealing engagement between the sealing member and each of the valve surfaces.

52. The rotary pressure swing adsorption apparatus as claimed in claim 51, wherein the first sealing member is interposed between the valve surfaces, and biassed into the sealing engagement.

53. The rotary pressure swing adsorption apparatus as claimed in claim 52, wherein the first sealing member is interposed between, and biassed and urged into the sealing engagement.

54. The rotary pressure swing adsorption apparatus as claimed in claim 53, wherein the first sealing is disposed within a groove provided in the corresponding rotor valve surface, and is maintained in sealing engagement with the groove.

55. The rotary pressure swing adsorption apparatus as claimed in claim 54, wherein the first sealing member is biassed and urged into sealing engagement by a resilient member captioned between the at least one of (i) the first rotor valve surface and the first stator valve surface, and (ii) the second rotor valve surface and the second stator valve surface.

56. The rotary pressure swing adsorption apparatus as claimed in claim 55, wherein the resilient member has a lower elastic modulus than the first sealing member.

57. The rotary pressure swing adsorption apparatus as claimed in claim 56, wherein the resilient member is keyed within a groove provided in the corresponding rotor valve surface.

58. The rotary pressure swing adsorption apparatus as claimed in claim 57, wherein the resilient member is a second sealing member.

59. The rotary pressure swing adsorption apparatus as claimed in claim 53, wherein the sealing member is biassed and urged into the sealing engagement by fluid pressure forces applied to a portion thereof.

60. An axial flow rotary pressure swing adsorption apparatus for implementing a pressure swing adsorption process having an operating pressure cycling between an upper pressure and a lower pressure for extracting a first gas fraction and a second gas fraction from a mixture including the first and second gas fractions, the apparatus comprising:
   a stator including a first stator valve surface, a second stator valve surface, a plurality of first function compartments opening into the first stator valve surface, and a plurality of second function compartments opening into the second stator valve surface;
   a rotor rotatably coupled to the stator for rotation about a first axis, including a first rotor valve surface disposed at a first rotor end and in communication with the first stator valve surface, a second rotor valve surface disposed at a second rotor end and in communication with the second stator valve surface, and a plurality of apertures provided in the rotor valve surfaces, the rotor further comprising:
      an inner cylindrical wall, including a first face and an opposite second face,
      an outer cylindrical wall, presenting a first face and an opposite second face; and
      a plurality of partitions laterally extending between and joining the inner cylindrical wall and the outer cylindrical wall to thereby define a plurality of flow paths extending between the first and second end of the rotor, each of the flow paths including adsorbent material disposed therein, each of the partitions including a first face and an opposite second face;
         wherein the first faces merge with one another to define a first rotor valve surface, and
         wherein the second faces merge with one another to define a second rotor valve surface;
   a sealing member of unitary construction, interposed between and in sealing engagement with the one of (i) the first rotor valve surface and the first stator valve surface, and (ii) the second rotor valve surface and the second stator valve surface, comprising:
      (a) a plurality of laterally extending sealing members, each of the laterally extending sealing members being aligned with the corresponding face of a respective one of the partitions;
      (b) an inner circumferential sealing member aligned with the corresponding face of the inner cylindrical wall; and
      (c) an outer circumferential sealing member aligned with the corresponding face of the outer cylindrical wall;
         wherein the laterally extending sealing members extend between and join the inner and outer circumferential sealing members.

61. The pressure swing adsorption apparatus as claimed in claim 60, wherein the laterally extending sealing members extend radially between the inner and outer circumferential sealing members.

62. The pressure swing adsorption apparatus as claimed in claim 61, wherein at least one of the sealing members is biassed into sealing engagement with the corresponding stator valve surface.

63. The pressure swing adsorption apparatus as claimed in claim 62, wherein the at least one sealing member is biassed and urged into sealing engagement by a resilient member captured between the at least one of (i) the first rotor valve surface and the first stator valve surface, and (ii) the second rotor valve surface and the second stator valve surface.

64. The rotary pressure swing adsorption apparatus as claimed in claim 63, wherein the resilient member is characterized by lower elastic modulus than the first sealing member.

65. The rotary pressure swing adsorption apparatus as claimed in claim 64, wherein the resilient member is disposed within a groove provided in the corresponding rotor valve surface.

66. The rotary pressure swing adsorption apparatus as claimed in claim 65, wherein the resilient member is keyed within a groove provided in the corresponding rotor valve surface.

67. The rotary pressure swing adsorption apparatus as claimed in claim 66, wherein the resilient member is a second sealing member.

68. An axial flow rotary pressure swing adsorption apparatus for implementing a pressure swing adsorption process having an operating pressure cycling between an upper pressure and a lower pressure for extracting a first gas fraction and a second gas fraction from a mixture including the first and second gas fractions, the apparatus comprising:

a stator including a first stator valve surface, a second stator valve surface, a plurality of first function compartments opening into the first stator valve surface, and a plurality of second function compartments opening into the second stator valve surface;

a rotor rotatably coupled to the stator for rotation about a first axis, including a first rotor valve surface disposed at a first rotor end and in communication with the first stator valve surface, a second rotor valve surface disposed at a second rotor end and in communication. with the second stator valve surface, and a plurality of apertures provided in the rotor valve surfaces, wherein at least one of the rotor valve surfaces includes a sealing member of unitary construction disposed in sealing engagement with the corresponding stator surface, the sealing member comprising:
(a) a plurality of laterally extending sealing members;
(b) an inner circumferential sealing member; and
(c) an outer circumferential sealing member;
  wherein the laterally extending sealing members extend between and join the inner and outer circumferential sealing members to define a plurality of flow paths.

\* \* \* \* \*

UNITED STATES PATENT AND TRADEMARK OFFICE
CERTIFICATE OF CORRECTION

PATENT NO. : 6,533,846 B1
DATED : March 18, 2003
INVENTOR(S) : Bowie G. Keefer et al.

It is certified that error appears in the above-identified patent and that said Letters Patent is hereby corrected as shown below:

Title page,
Item [63], U.S. Application Priority Data, "[63] Continuation of application No. PCT/CA00/00695, filed on June 12, 2000." should read as follows:
-- [63] Continuation-In-Part of application No. PCT/CA00/00695, filed on June 12, 2000. --
Insert Item:
    -- [30]     Foreign Application Priority Data

June 10, 1999   (CA)……………………..2,274,312 --.

Column 1,
Line 5, "This application is a continuation of international application PCT/CA00/00695, filed Jun. 12, 2000." should read as follows:
    -- This application is a continuation-in-part of international Application No. PCT/CA00/00695, filed June 12, 2000 (which designates the U.S. and was published in English as International Publication No. WO 00/76630 A1), which claims benefit of CA 2,274,312, filed June 10, 1999. --

Signed and Sealed this

Twentieth Day of July, 2004

JON W. DUDAS
*Acting Director of the United States Patent and Trademark Office*